US008792786B2

(12) United States Patent
Whelihan et al.

(10) Patent No.: US 8,792,786 B2
(45) Date of Patent: Jul. 29, 2014

(54) PHOTONICALLY-ENABLED IN-FLIGHT DATA REORGANIZATION

(75) Inventors: David J. Whelihan, Framingham, MA (US); Scott M. Sawyer, Auburndale, MA (US); Jeffrey J. Hughes, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 147 days.

(21) Appl. No.: 13/477,943

(22) Filed: May 22, 2012

(65) Prior Publication Data
US 2013/0243429 A1 Sep. 19, 2013

Related U.S. Application Data

(60) Provisional application No. 61/611,097, filed on Mar. 15, 2012.

(51) Int. Cl.
*H04B 10/00* (2013.01)
*H04J 14/00* (2006.01)

(52) U.S. Cl.
USPC ............................. 398/48; 298/47; 298/164

(58) Field of Classification Search
USPC ................... 398/47, 55, 52, 45, 48, 155, 164
See application file for complete search history.

(56) References Cited

U.S. PATENT DOCUMENTS

| 6,898,013 | B2 | 5/2005 | Hall | |
| 7,466,884 | B2 * | 12/2008 | Beausoleil | 385/49 |
| 7,532,785 | B1 | 5/2009 | Beausoleil et al. | |
| 7,786,427 | B2 | 8/2010 | Forrest et al. | |
| 7,894,699 | B2 | 2/2011 | Beausoleil | |
| 8,064,739 | B2 * | 11/2011 | Binkert et al. | 385/14 |
| 8,335,434 | B2 * | 12/2012 | Beausoleil et al. | 398/89 |
| 8,473,659 | B2 * | 6/2013 | Koka et al. | 710/124 |
| 2008/0112703 | A1 * | 5/2008 | Beausoleil et al. | 398/50 |
| 2011/0010525 | A1 | 1/2011 | Binkert et al. | |
| 2011/0052199 | A1 | 3/2011 | Beshai | |
| 2011/0103799 | A1 | 5/2011 | Shacham et al. | |

OTHER PUBLICATIONS

Luo, F., et al., "Photonic Switching Network for Parallel Multiprocessor Cluster System Using VCSEL Laser Arrays," *Proc. SPIE Int. Opt. Eng.*, 4913: 214-220 (2002).

* cited by examiner

*Primary Examiner* — Dalzid Singh
(74) *Attorney, Agent, or Firm* — Hamilton, Brook, Smith & Reynolds, P.C.

(57) ABSTRACT

Data locality constraints are alleviated by a data processing system and method of reorganizing data. Multiple electronic components are configured to modulate a light beam on a shared photonic interconnect and to detect the data according to a global schedule to reorganize data across the multiple electronic components. By constructing data transfer patterns in a shared photonic interconnect, rather than in dedicated reorganization hardware, data is reorganized while in transit, greatly accelerating the reorganization of data, and reducing the amount of power-consuming hardware necessary to achieve the task.

38 Claims, 32 Drawing Sheets

$$\begin{bmatrix} d_{0,0} & d_{1,0} & \cdots & d_{i,0} \\ d_{0,1} & d_{1,1} & & \\ \vdots & & \ddots & d_{i,j} \\ d_{0,j} & & & \end{bmatrix}^T = \begin{bmatrix} d_{0,0} & d_{0,1} & \cdots & d_{0,j} \\ d_{1,0} & d_{1,1} & & \\ \vdots & & \ddots & d_{j,i} \\ d_{i,0} & & & \end{bmatrix}$$

*Fig. 10*

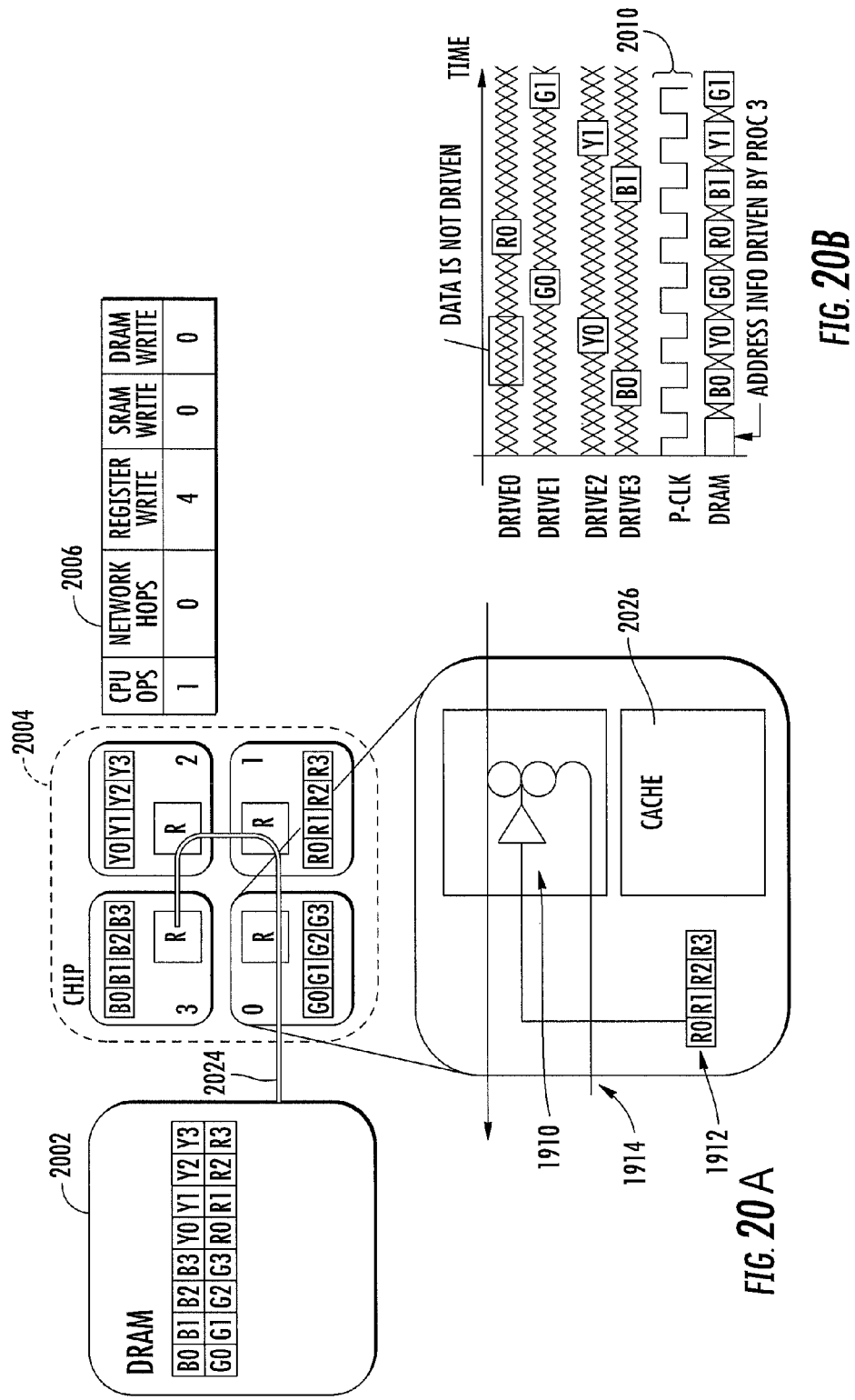

| cpu ops | network hops | network register write | sram write | dram write |
|---|---|---|---|---|
| 1 | 0 | 4 | 0 | 2 |
| 28 | 4 | 8 | 8 | 2 |

Photonic
Electrical

PHOTONICALLY-ENABLED IN-FLIGHT DATA REORGANIZATION

RELATED APPLICATION

This application claims the benefit of U.S. Provisional Application No. 61/611,097, filed on Mar. 15, 2012; the entire teachings of the above application are incorporated herein by reference.

GOVERNMENT SUPPORT

This invention was made with government support under Contract No. FA8721-05-C-0002 awarded by the United States Air Force. The government has certain rights in the invention.

BACKGROUND OF THE INVENTION

Parallel processing algorithms take advantage of multi-processing computer architectures by distributing portions of the data among a plurality of processing elements. Algorithmic processing takes place until the system state reaches a point in which the necessary data becomes non-local to the processing elements. Hence, a re-distribution of data must be carried out prior to the next stage of algorithmic computation. Depending on the required state of data re-distribution, this operation can be very challenging to the communication system that ties the processing elements together.

Data re-distribution in system memory can pose additional challenges. System memory access is typically defined for a fixed set of increments and optimized for particular access patterns. As an example, a memory interface may only permit accesses of 64 or 128 bytes, and though system memory permits random access, it is understood by those skilled in the art that accessing contiguous address space is most efficient. Depending on the distribution of data within the multi-processor, and the required staging for the next phase of computation, a given processing element may require a large number of non-contiguous data accesses which are smaller than the allowable memory access sizes.

Current multi-processor performance suffers under the scenario where a small amount of data is scattered among several processing or storage elements. An example of a challenging data re-distribution occurs when a large number of unique data values must be distributed among a plurality of processing or memory elements for real time processing. A reverse situation occurs when many processing or memory elements must each individually send a small amount of data to a single location on the multi-processor.

SUMMARY OF THE INVENTION

Data may be reorganized efficiently while in transit among a plurality of processing or storage devices communicating via a photonic channel. The purpose is to greatly accelerate the reorganization of data in a multi-processor computer system using photonic interconnect, while reducing the amount of power-consuming hardware necessary to achieve the task. This will translate into well over an order of magnitude improvement in efficiency for the overall computer system.

The efficiency gain is achieved by using a shared photonic channel to synthesize a monolithic transaction between many data producing devices and one or more data consumer devices. Conversely, independent portions of a monolithic transaction sent by one data producer may be consumed by many devices. This operation is different from a broadcast operation where one data producer device sends the same transaction to many data consumer devices. These data transfer patterns are constructed in the photonic interconnect, rather than in dedicated reorganization hardware.

In accordance with some embodiments, a new type of communication mode is introduced that allows a number of spatially separate devices to synchronously create a single transaction on a photonic interconnect, where a transaction may be defined as a monolithic communication event between one or more participating multi-processor elements in which an arbitrary amount of data is transferred. Such transactions may be synthesized in-flight (i.e. in the communication channel), by tightly coordinating the actions of those devices. Some embodiments cover the inverse operation, where a monolithic transaction may be efficiently decomposed into its constituent data elements and distributed across a computer system. This mode of communication is possible because of the unique properties of photonic interconnect, namely distance independence, high fan-out/fan-in, and ease of synchronization enabled by distance independence. Accordingly, a key bottleneck in modern high-performance computing may be alleviated.

In example embodiments, a data processing system featuring a shared photonic interconnect is presented. In addition to the shared photonic interconnect, the data processing system may also comprise multiple electronic components, such as processors, memory controllers, Field Programmable Gate Arrays (FPGAs), Application Specific Integrated Circuits (ASICs) or other suitable electronic components or combination thereof as may be known by those skilled in the art. Each electronic component may be configured to modulate a light beam on the shared photonic interconnect and to receive the data from the modulated light beam according to a global schedule to reorganize data across the multiple electronic components. A light beam may comprise one or more wavelengths. The one or more wavelengths may be formed in any suitable way such as by utilizing a separate laser for each wavelength.

According to some embodiments, a method of reorganizing data across multiple electronic components may comprise, at one or more of the electronic components, modulating at least one light beam on a shared photonic interconnect with data according to a defined global schedule. The global schedule may be statically or dynamically defined and may be dynamically updated.

The method may further comprise, at one or more of the electronic components, receiving data from the modulated light beam according to the defined global schedule. Furthermore, the data may be sent from at least one electronic component to plural electronic components or from plural electronic components to at least one electronic component to reorganize the data across the electronic components.

At least one of the electronic components may be a memory controller and the data from plural electronic components may be used to modulate the at least one light beam. The data may be received by the memory controller as a single transaction and written to memory. The memory controller may then modulate at least one second light beam on the shared photonic interconnect with data read from memory. The data may be received from the second light beam at plural electronic components. The plural electronic components may be formed on a common integrated circuit chip or among a number of processing chips.

Further, at least one of the electronic components may be a memory controller and the memory controller may read the data from memory and the at least one light beam may then be modulated on the shared photonic interconnect with the data read from memory according to the defined global schedule. The shared photonic interconnect may comprise one or more waveguides.

The data may be wavelength division multiplexed onto the shared photonic interconnect, the data may be time division multiplexed onto the shared photonic interconnect, or the data may be spatially multiplexed on multiple waveguides of the shared photonic interconnect. Further, the data may be multiplexed on the shared photonic interconnect based on at least two of wavelength, time, and space.

The data may be reorganized to perform a matrix transpose operation. The data may be reorganized in processing a Fast Fourier Transform.

A global clock may be transmitted to the electronic components over the shared photonic interconnect. Furthermore, the shared photonic interconnect may include one or more waveguides, such as one or more silicon waveguides, or any other suitable light transmission medium. A suitable light transmission medium may include free space.

Further, a computer program product may control communication patterns within a data processing system. The data processing system may comprise a shared photonic interconnect and multiple electronic components. The computer program product may comprise a computer readable storage medium having computer readable communication program code embodied therewith, the computer readable communication program code may be configured to set a schedule. The schedule may be loaded into one or more of the electronic components, the one or more electronic components may modulate at least one transmit light beam on the shared photonic interconnect with transmit data according to the schedule, the one or more electronic components may receive data from a modulated receive light beam on the shared photonic interconnect according to the schedule. The computer readable program code may be executed synchronous to a global clock being carried by the shared photonic waveguide.

Additionally, the computer readable program code may be derived from a software tool or chain of tools based on a high-level instruction specifying a Fast Fourier Transform. The computer readable storage medium may include computer readable computation control program code embodied therewith, the computation control program code may be derived from different phases of an algebraic computation. The algebraic computation may be a Fast Fourier Transform.

The computer readable computation control program code may be executed synchronous to a global clock being carried by the shared photonic waveguide. The computer readable computation control program code may be derived from a software tool or chain of tools based on a high-level instruction specifying the algebraic computation.

Further, an electronic component in a data processing system may be configured to reorganize data; the electronic component may comprise a computation core. The computation core may comprise an execution unit coupled to at least one memory, the execution unit may be configured to execute computation instructions stored in the at least one memory. A network interface unit may be coupled to the at least one memory and a communication memory, the network interface unit may be configured to distribute data to the at least one memory and the communication memory. In addition, a waveguide interface unit may be coupled to the network interface unit, the communication memory, and a shared photonic interconnect. The waveguide interface unit may be configured to coordinate reorganization of data based on communication instructions stored in the communication memory. The reorganization of data coordinated may be used to perform a matrix transpose operation. The reorganization of data coordinated may be based on processing of a Fast Fourier Transform.

Furthermore, the at least one memory may comprise local memory and computation memory. The communication instructions may comprise a schedule, and the electronic component may receive data from a modulated light beam according to the schedule.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 10-11 illustrate a matrix transpose operation.

FIGS. 19-21B illustrate steps of a matrix transpose using a photonic interconnect.

FIG. 22 is an operational comparison between performing a matrix transpose using electronic and photonic interconnects.

DETAILED DESCRIPTION OF THE INVENTION

A description of example embodiments of the invention follows.

An example system of processing nodes communicating over a shared photonic interconnect is first described. Processing nodes can store and utilize data communicated in transactions. While this is one example of a processing node, others may be suitable such as dedicated memory devices or input/output devices. For this example, the participants coordinate to synthesize a monolithic transaction to a single processing node. This can be accomplished by assigning each processing node a unique identifier and a simple program describing when it must send its component of the transaction on the photonic interconnect. The result, from the perspective of the receiving processing node, is a transaction that is indistinguishable from a point-to-point transaction between two processing nodes.

Figure 1:
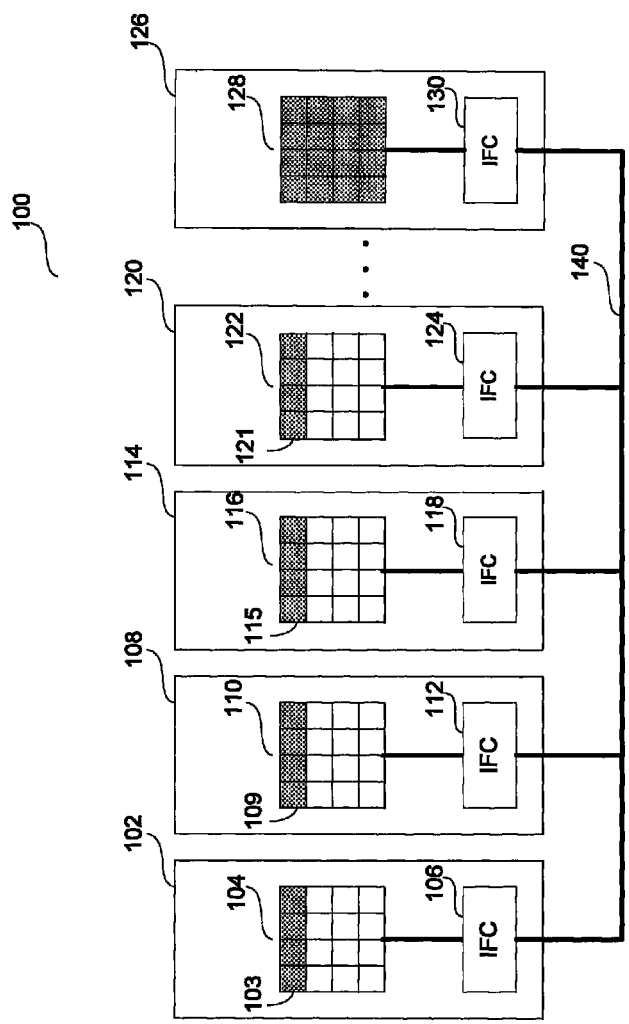
FIG. 1 is a representative arrangement of processing nodes.

Turning to FIG. 1, a representative arrangement 100 of processing nodes (102, 108, 114, 120, 126), each of which contains a local memory element (104, 110, 116, 122, 128), and an interface (106, 112, 118, 124, 130) to a shared interconnect 140, is shown. At time zero in this example, each processing node contains a single row (103, 109, 115, and 121) of data. A row is the smallest amount of data efficiently accessible in those memories. Any smaller access costs the same in terms of energy and time as reading the entire row. Thus, it is most efficient to access data one full row at a time. Each processing node's interface permits data to be written from local memory to any other processing node's local memory. The shared interconnect is a photonic channel in which one or more wavelengths of light propagate between the interfaces. The channel is uni-directional, and all light travels in the direction of processing node 126.

Figure 2:
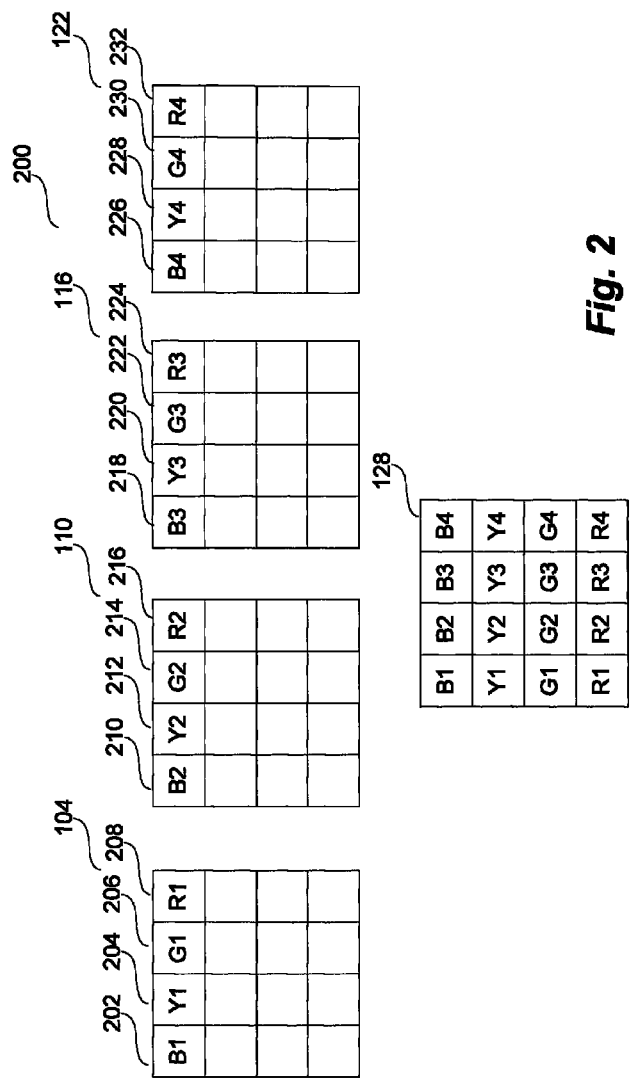
FIG. 2 is a representation of data elements written to a memory.
Figure 3:
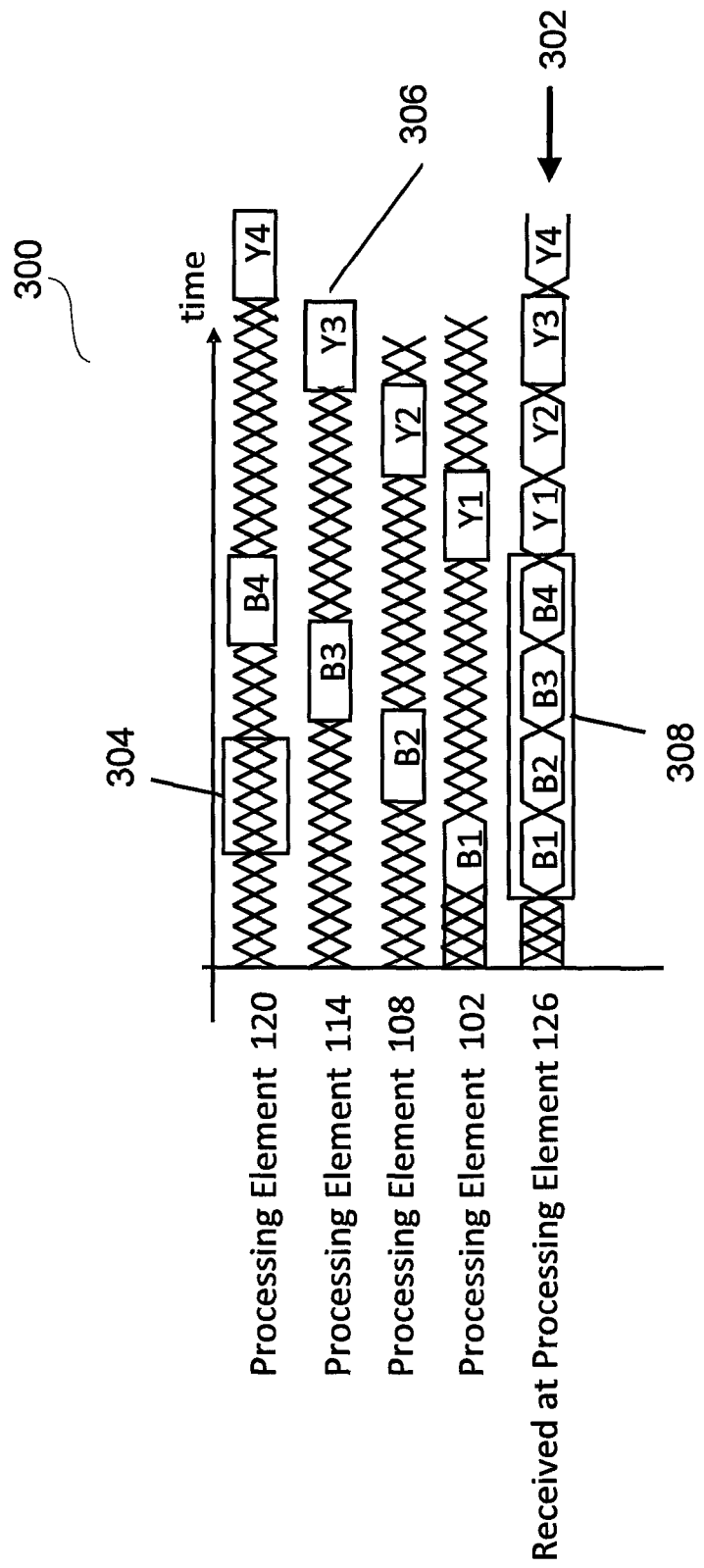
FIG. 3 is a representation of a communications pattern as seen from the point of view of each participating processing node.

FIG. 2 200 is a representation of data elements written to memory. FIG. 2 shows the data in each of the contained rows is comprised of four elements, each denoted by a letter: B, Y, G, and R, and a number 1-4. The letters B, Y, G, and R, are to reflect the illustrations in colors Blue, Yellow, Green, and Red, respectively. There are 16 elements of data in this example system. In this example, the data in each of the four nodes is to be written efficiently to the processing node 126 in such a way that all of the B elements (202, 210, 218, 226) are sequentially written to a row in 128, and all of the Y elements (204, 212, 220, 228) are sequentially written to another row in 128, and so on, until all 16 elements (202, 210, 218, 226, 204, 212, 220, 228, 206, 214, 22, 230, 208, 216, 224, 232) have been written into 126's memory 128. Hence, at the end of the example operation, the memory in node 126 will contain all of the data stored in the other four processing nodes, albeit in a different order, as shown in FIG. 2. To most efficiently write the memory 128 in processing node 126, all of the other four processors will coordinate single element writes to the photonic channel such that node 126's interface 130 receives a full row of data as a single transaction, which can be efficiently written to its local memory. FIG. 3 does not reflect all the B, Y, G, and R, elements of FIG. 2; however, the element writes would follow the pattern as those already illustrated in FIG. 3 300.

This coordination is enabled by the photonic channel's distance independence and ease of synchronization to sequence accesses based upon a unique processing node ID and a simple schedule. A schedule is defined as a plan over time of which photonic channels will be used to transmit or receive data, and when they will be used.

This results in the data pattern 302 shown in FIG. 3, as seen from the point of view of processing node 126. The data pattern 304 indicates data not being driven, whereas data such as 306 indicates data being driven as a transaction element. In the figure, two, four element data sets, B1-B4 and Y1-Y4, are transmitted from four of the processing nodes 102, 108, 114, and 120. The first four element set 308 is a monolithic transaction interpreted as a single row access by the receiving processing node, as is the following four element (Y1-Y4) synthesized transmission. This transmission is optimally sized to be utilized most efficiently by the receiving processing node.

Figure 4:
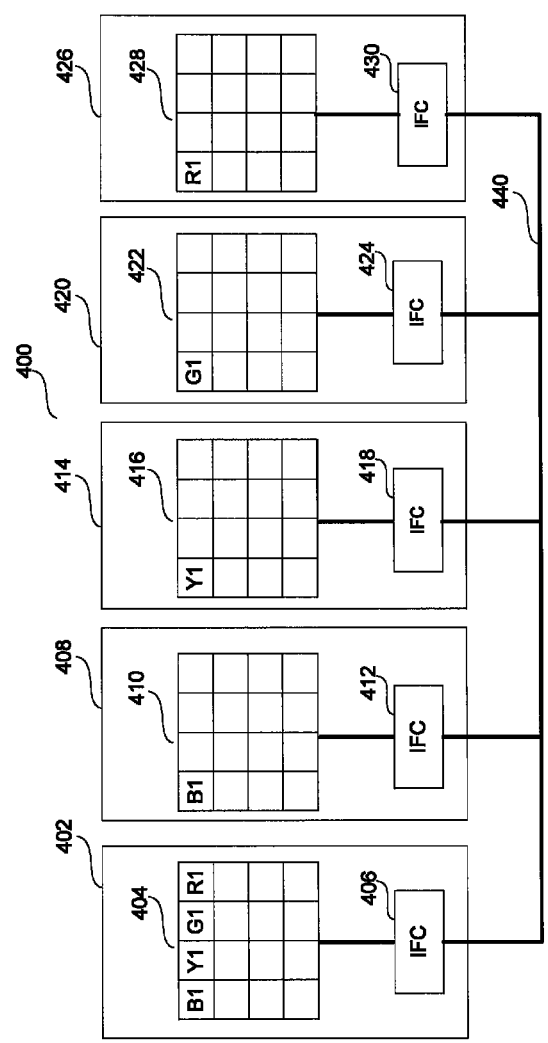
FIG. 4 is a representation of data elements distributed from a memory element.
Figure 5:
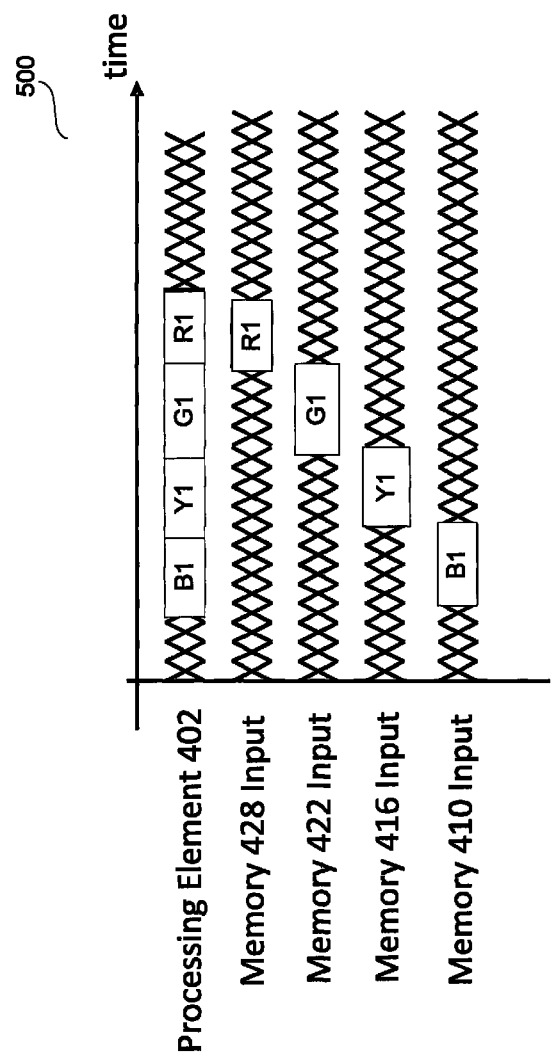
FIG. 5 is a representation of data distributed to multiple processing nodes as seen from the point of view of each processing node.

Also, within this scope is the inverse process. The inverse process may be that of an optimal-sized transaction being formulated in a single processing element, then transmitted such that a number of other processing elements capture the relevant elements. That process, which facilitates efficient de-localization of data (i.e. separating spatially co-located elements, as in a memory row, to a number of distinct processing elements) is very useful in parallel processing for the distribution of data prior to a computation. The example system shown in FIG. 4 shows the data element distribution 400 after the inverse access is performed. In that system, there are 5 processing elements (402, 408, 414, 420, and 426). FIG. 4 shows the processing elements (402, 408, 414, 420, 426), each containing a local memory element (404, 410, 416, 422, 428), and an interface (406, 412, 418, 424, 430) to a shared interconnect 440. Processing element 402 has a row of elements in its memory 404, each of which should be efficiently transmitted to processing elements 408, 414, 420, and 426. Processing element 402 initiates a single row-size monolithic transaction that propagates on the communication channel. Based upon a simple program which defines valid timeslots for the processing elements, each processing element performs a partial read from the channel to extract its data element from the monolithic transaction. A view of the data over time 500 is shown in FIG. 5. FIG. 5 is a representation of data distributed to multiple processing nodes as seen from the point of view of each processing node.

In the preceding example, the interconnect 440 is shared by allocating tight time windows to each processing element, effectively multiplexing the channel in time. This may also be applied to schemes in which the channel is multiplexed in wavelength (along the same photonic waveguide medium), or spatially, by replicating the photonic medium. Thus, according to one aspect, the data may be wavelength division multiplexed onto the shared photonic interconnect. According to another aspect, the data may be time division multiplexed onto the shared photonic interconnect. According to yet another aspect, the data may be spatially multiplexed on multiple waveguides of the shared photonic interconnect. Further, the data may be multiplexed on the shared photonic interconnect based on at least two of wavelength, time, and space.

Figure 6:
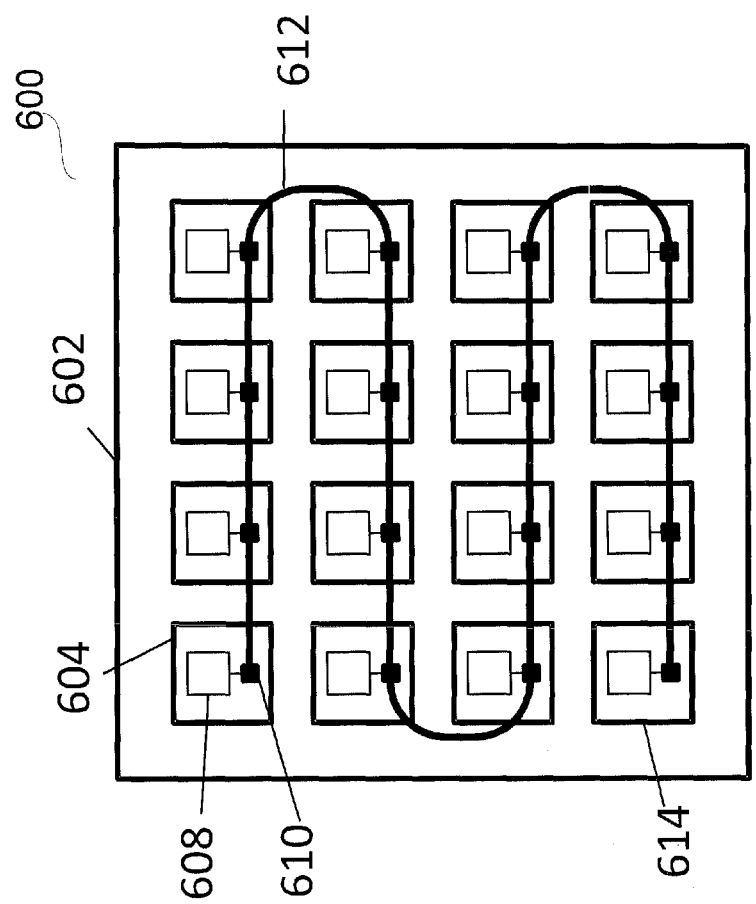
FIG. 6 is a representation of an embodiment of a multi-processor containing a chip-scale shared photonic waveguide.

In one embodiment, as shown in FIG. 6, a multi-processor 600 is fabricated on a single substrate (602). A plurality of processing nodes (604) is laid out in a two-dimensional grid to make efficient use of substrate. Each processing node contains a processor subsystem (608), which may contain a CPU and local memory bank. The processor subsystem connects to a network interface device (610). The network interface connects to a shared on-chip photonic waveguide (612), forming a shared interconnection network. The interconnect snakes around the chip from the first node (604) to the last node (614), such that all nodes are connected to the same waveguide. A global clock may be transmitted to the electronic components over the shared photonic interconnect.

Figure 7:
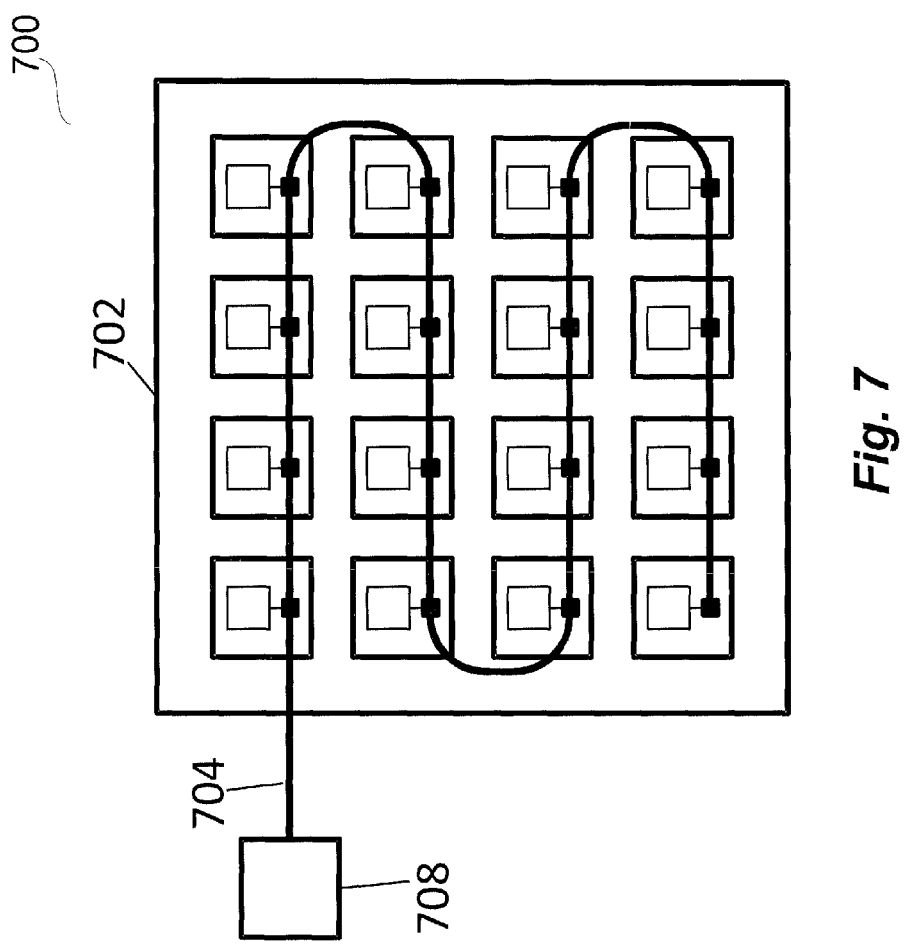
FIG. 7 is a representation of another embodiment of a multi-chip processor connected by a shared photonic waveguide.
Figure 8:
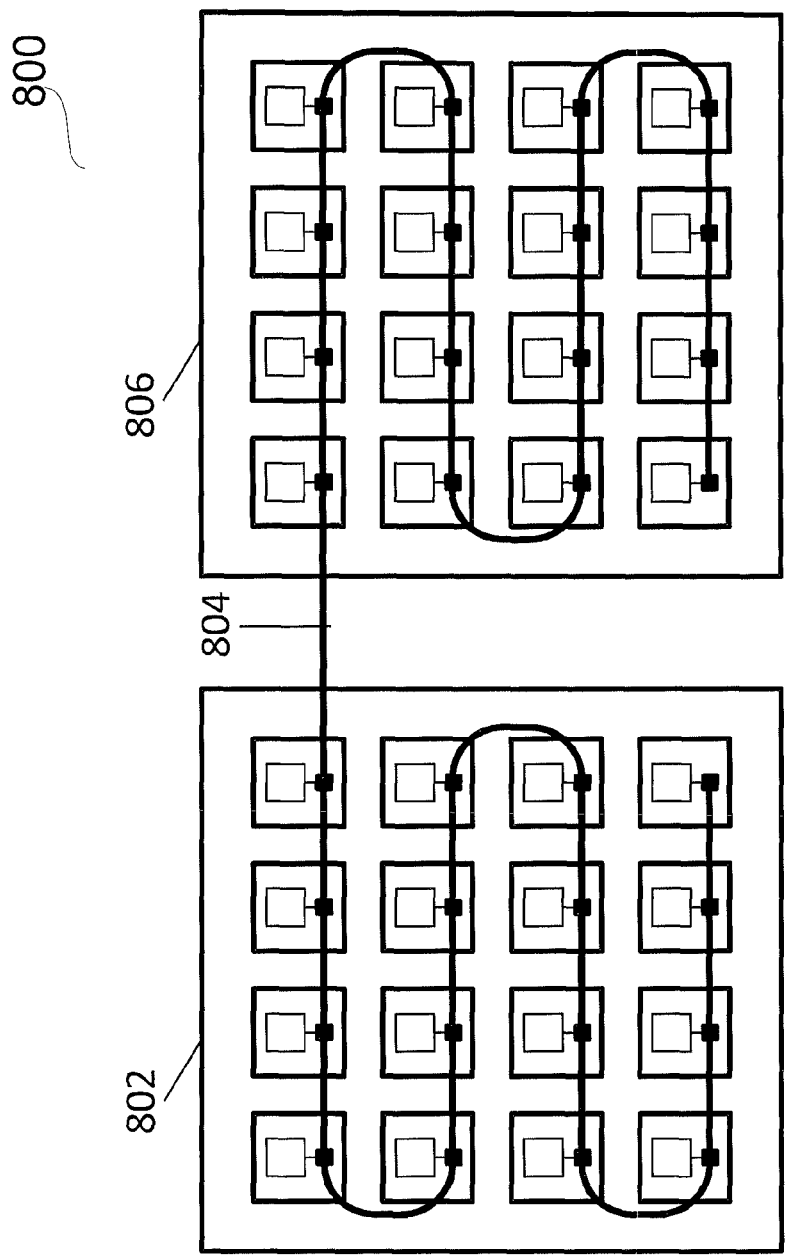
FIG. 8 is a representation of multiple chip-scale processors connected via a shared photonic waveguide.

In another embodiment, as shown in FIG. 7, a representation 700 of a multi-processor containing a chip-scale shared photonic waveguide is shown. The multi-processor (702) again contains a shared photonic interconnect such as the shared photonic waveguide (704). In this embodiment, the photonic interconnect extends beyond the chip boundary to enable connection to one or more external devices (708). The external device (708) may be another processor system, a memory, or some other I/O device in a computer system. In particular, the external device may be a second photonic multi-processor, as shown in FIG. 8. FIG. 8 800 is a representation of multiple chip-scale processors connected via a shared photonic interconnect. In this embodiment, one photonic Chip Multi-Processor (802) connects via shared network medium (804) to a second identical Chip Multi-Processor (806). In FIG. 8, the orientation of (806) has been mirrored along the Y-axis.

Figure 9:
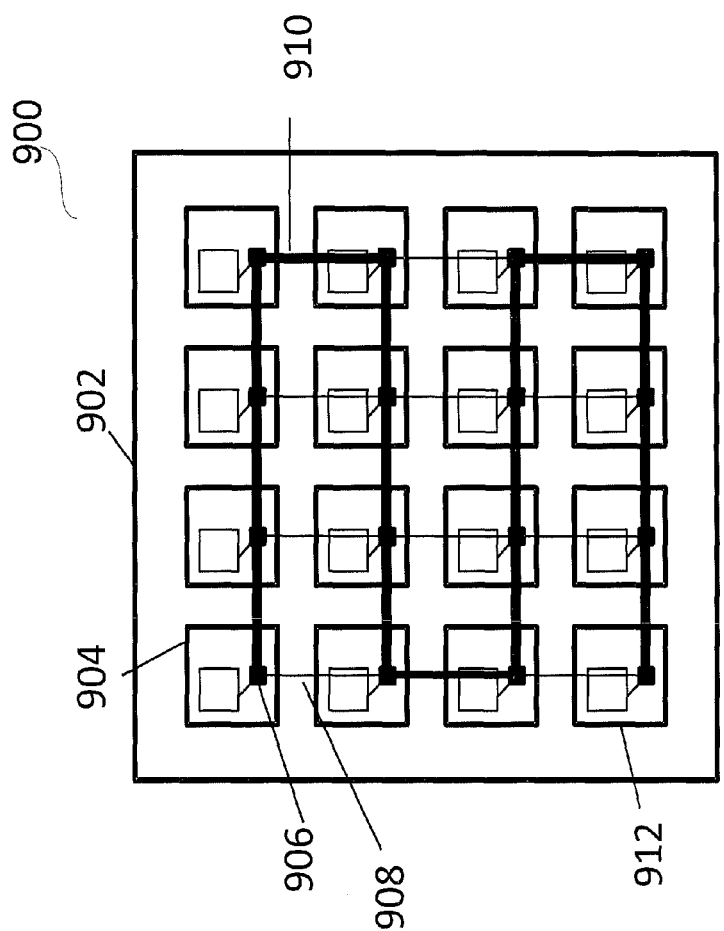
FIG. 9 is a representation of a multi-processor containing a plurality of processing nodes connected by a mesh of photonic waveguide links.

Turning to FIG. 9, a representation 900 shows a multi-processor (902) may contain a plurality of processing nodes (904) connected by a mesh of photonic links. Each processing node contains a 5-port photonic switch (906), capable of connecting any two ports (i.e. a single pole/5 throw switch). Closed circuit (i.e. active) connections are shown by a thick line (910), while open circuits (i.e. inactive) are shown with a thinner line (908). In the current configuration of the embodiment, a photonic interconnection network is formed connecting all devices from the first node (904) to last node (912).

The novel methods and apparatus described herein impact computation of a broad range of applications including applications kernels and fundamental operations. Fundamental operations and applications that are challenging to implement in modern multi-processing computers may be accelerated while increasing processor efficiency by minimizing both physical size and power. Current multi-processing computer architectures are constrained by the steep cost of access to memory, which is greatly exacerbated when applications access data in a non-local (i.e. not linearly ordered) manner.

One such operation, the linear algebraic matrix transpose, is extremely costly to efficiently implement in most modern computer systems, even in electrical circuits specialized for the task. Because the matrix transpose operation is a foundational operation in linear algebra, it is in turn, vital to many modern scientific and engineering pursuits. A matrix transpose operation starts with an N×M matrix, and ends with an M×N matrix after reflecting the matrix elements across the top-left to bottom-right diagonal. This operation is illustrated in FIG. 10 where i=M−1 and j=N−1.

The transpose operation, while relatively straightforward intuitively, becomes significantly more complicated when it is mapped to a computer architecture. This complication arises because the memory systems of modern computers group data address-wise into blocks that are accessed monolithically. Under most conditions, this makes sense, as access patterns exhibit significant spatial locality (i.e. if one accesses data located at address x, there is a high probability that the data at x+1 is also required). This leveraging of spatial locality is achieved by grouping memory into blocks that are accessed en masse. Therefore to read the data from address x, one must also read (and pay the price in energy) from address x+1, regardless of whether the data will be used or not. Thus, modern memory systems are not particularly well suited to access patterns that do not exhibit significant spatial locality. The techniques described herein alleviate these difficulties by simplifying the reorganization of the matrix despite widely spatially disparate data.

Figure 11:
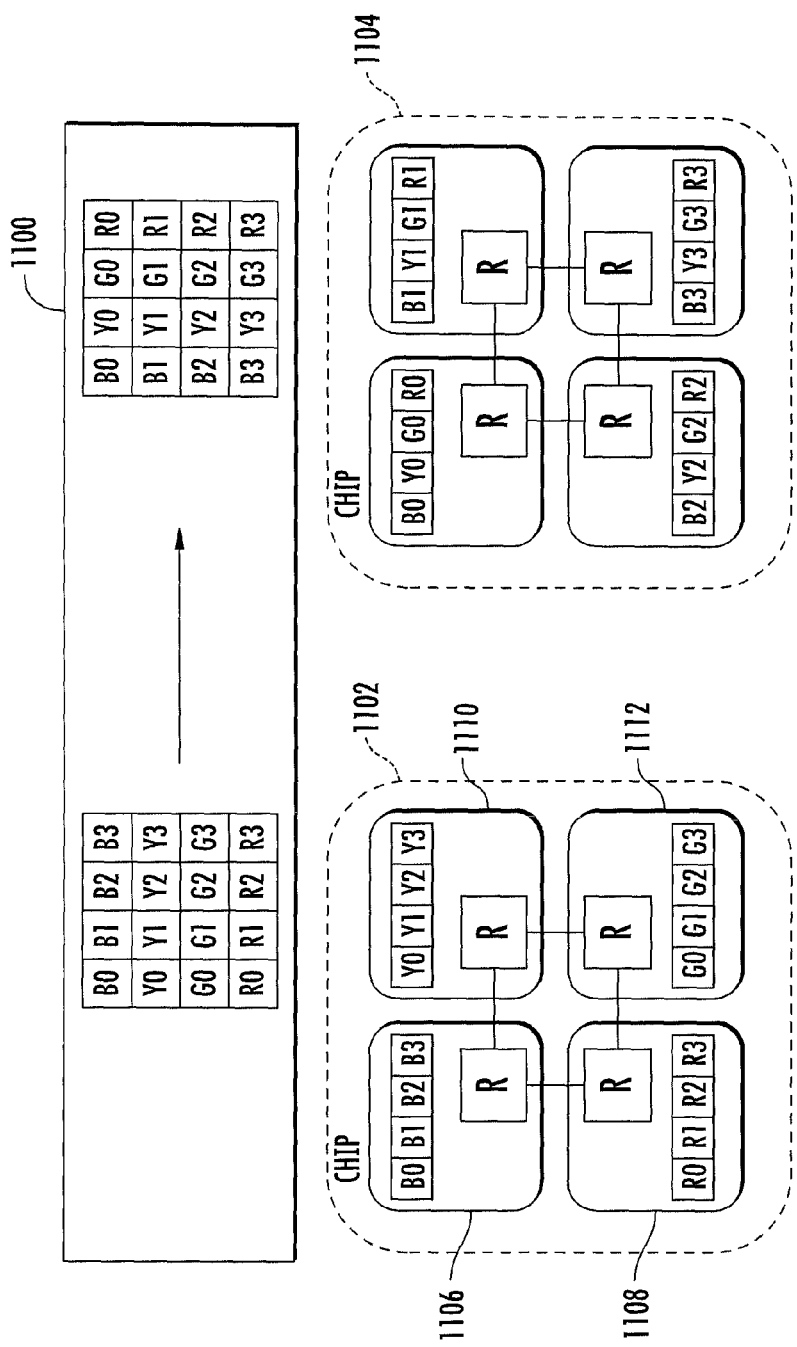
Figure 12:
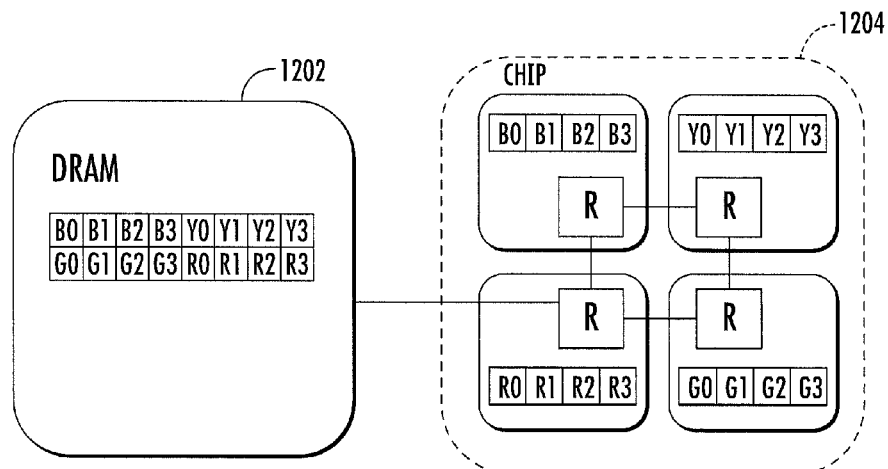
FIGS. 12-18 illustrate steps of a matrix transpose using an electronic interconnect.
Figure 13:
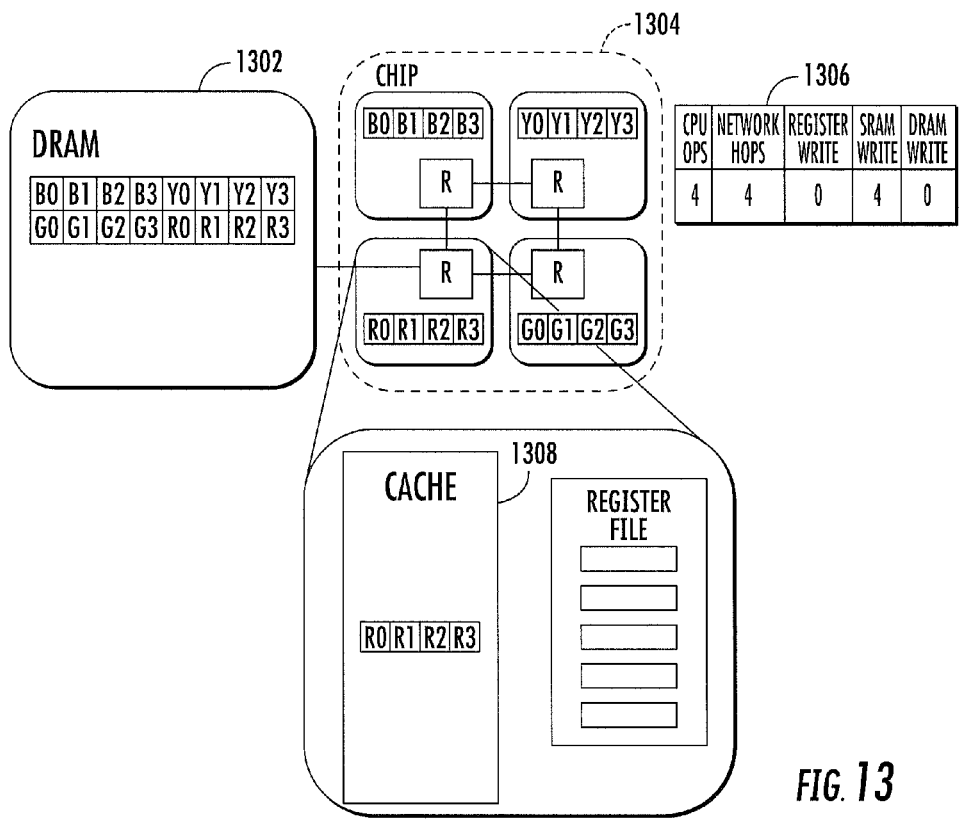
Figure 14:
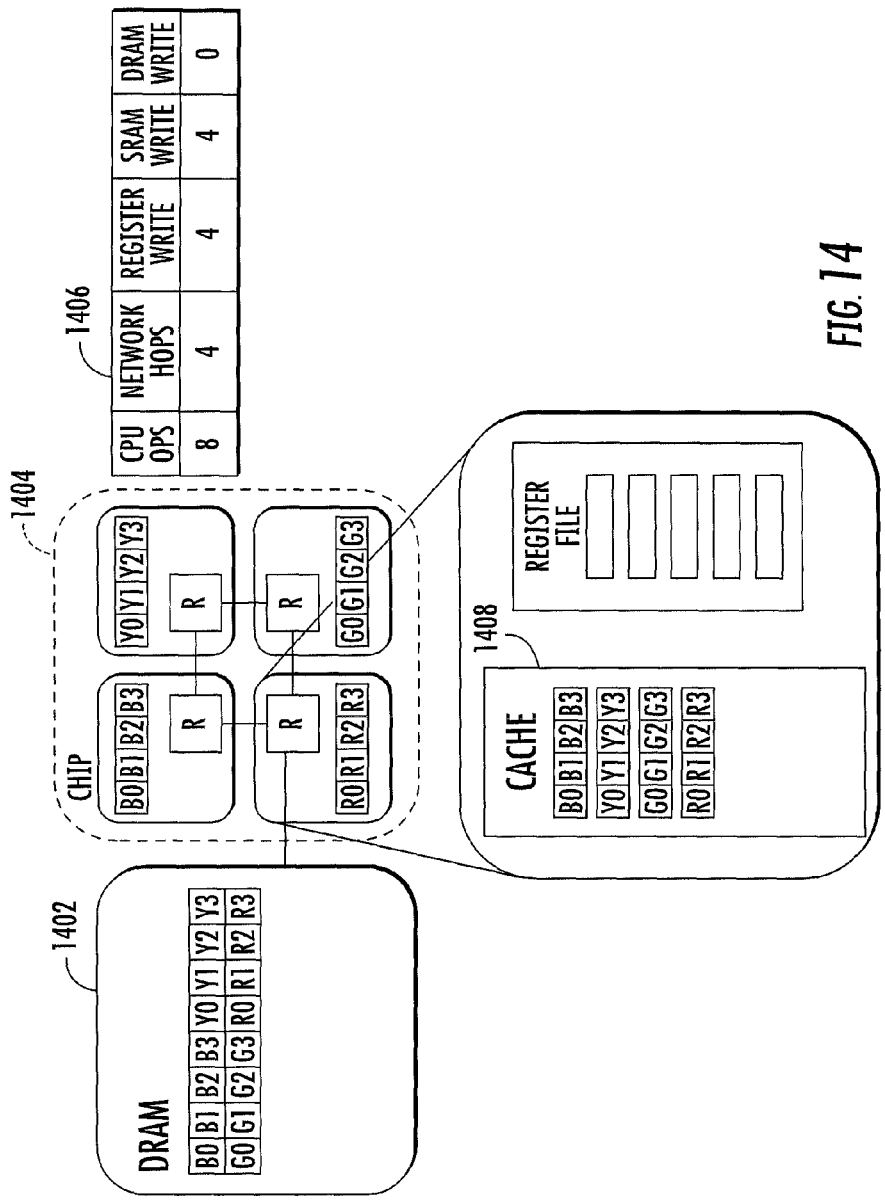
Figure 15:
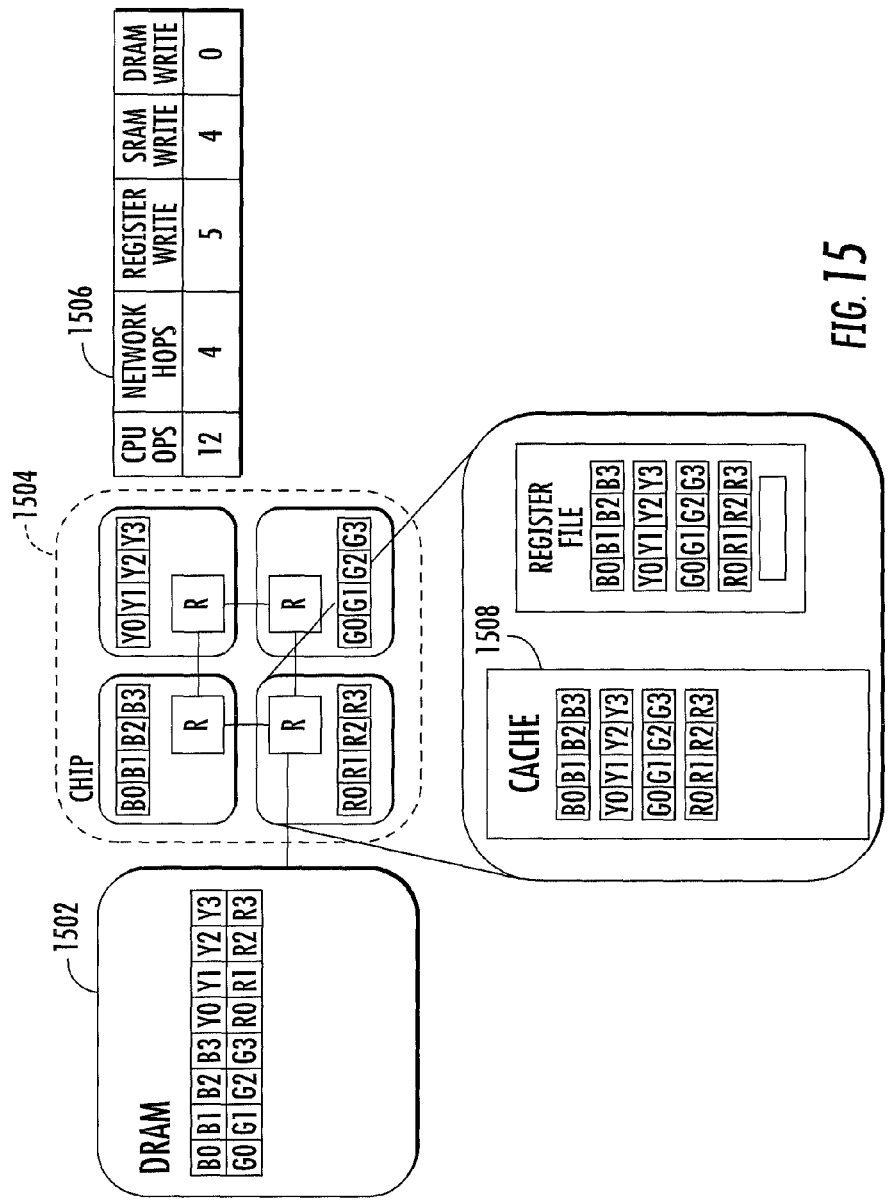
Figure 16:
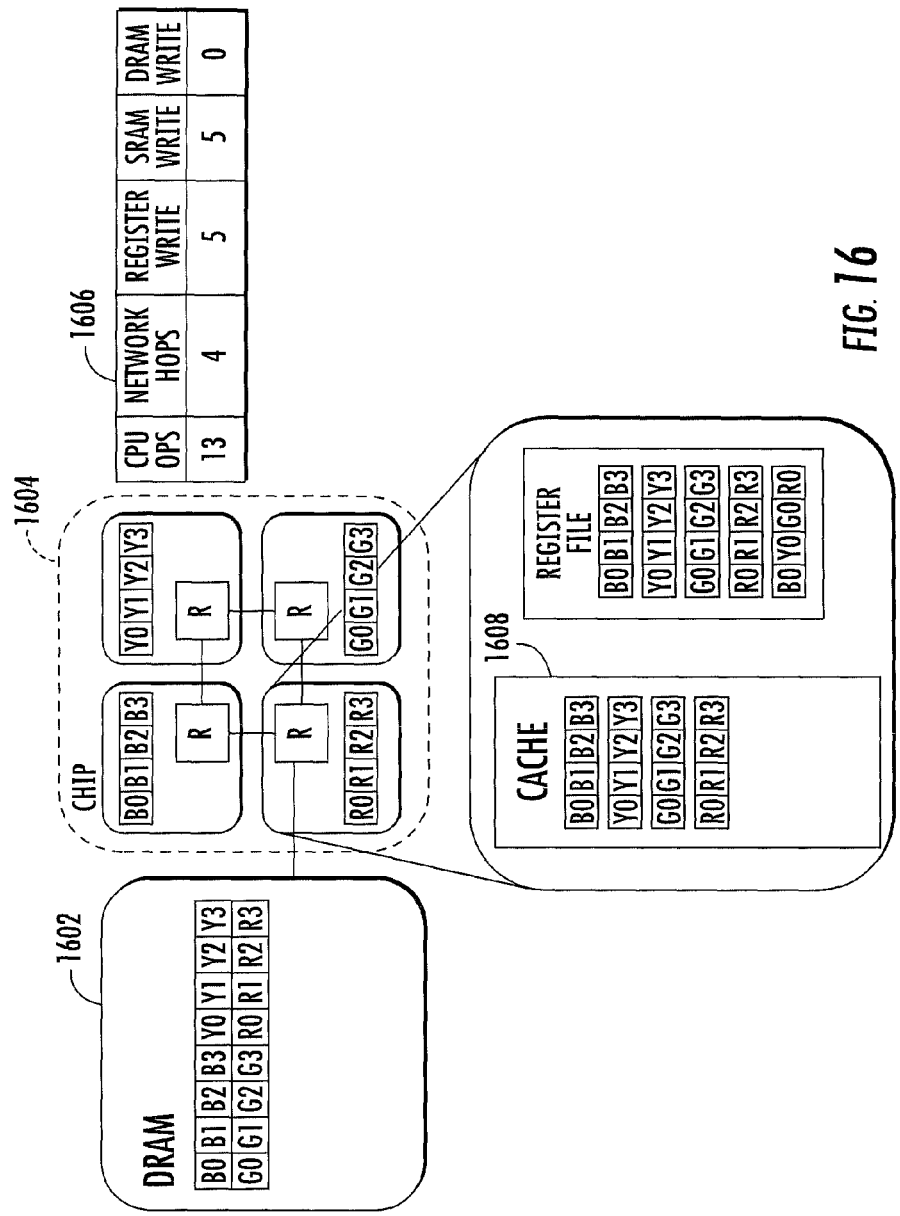
Figure 17:
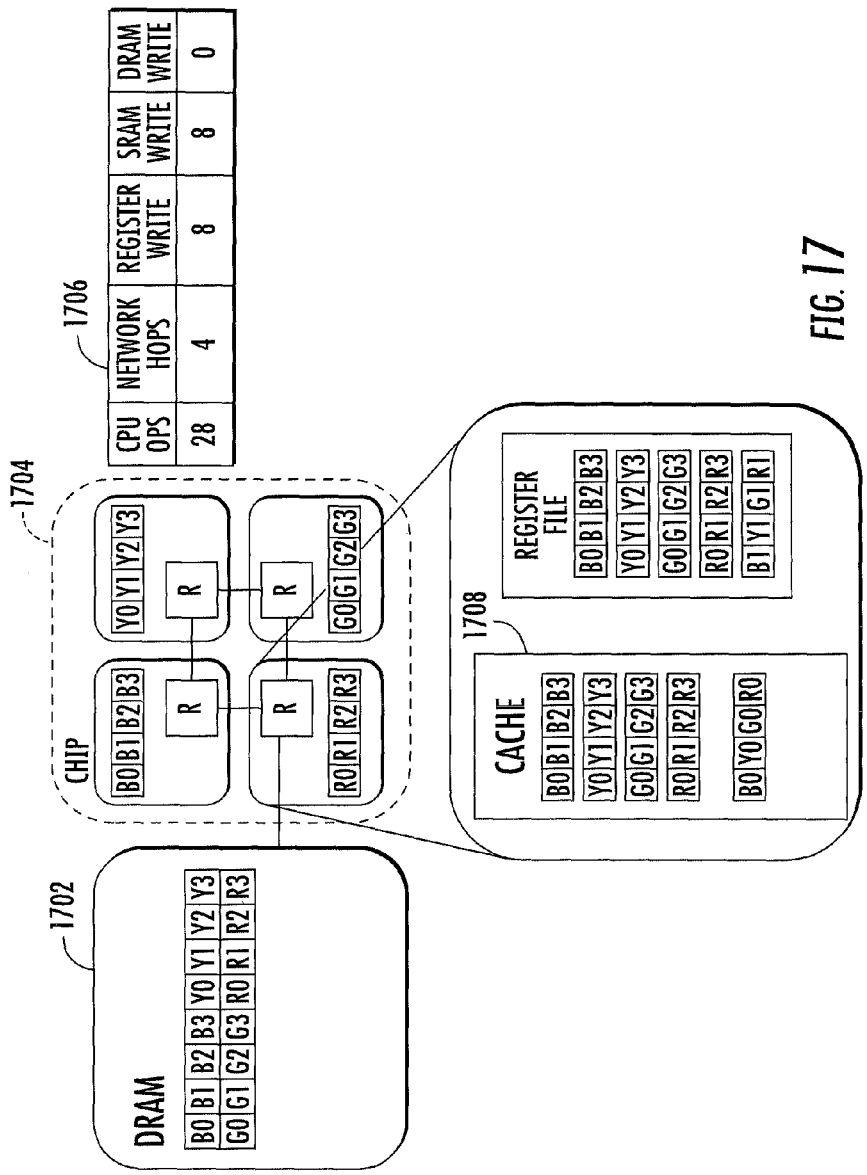
Figure 18:
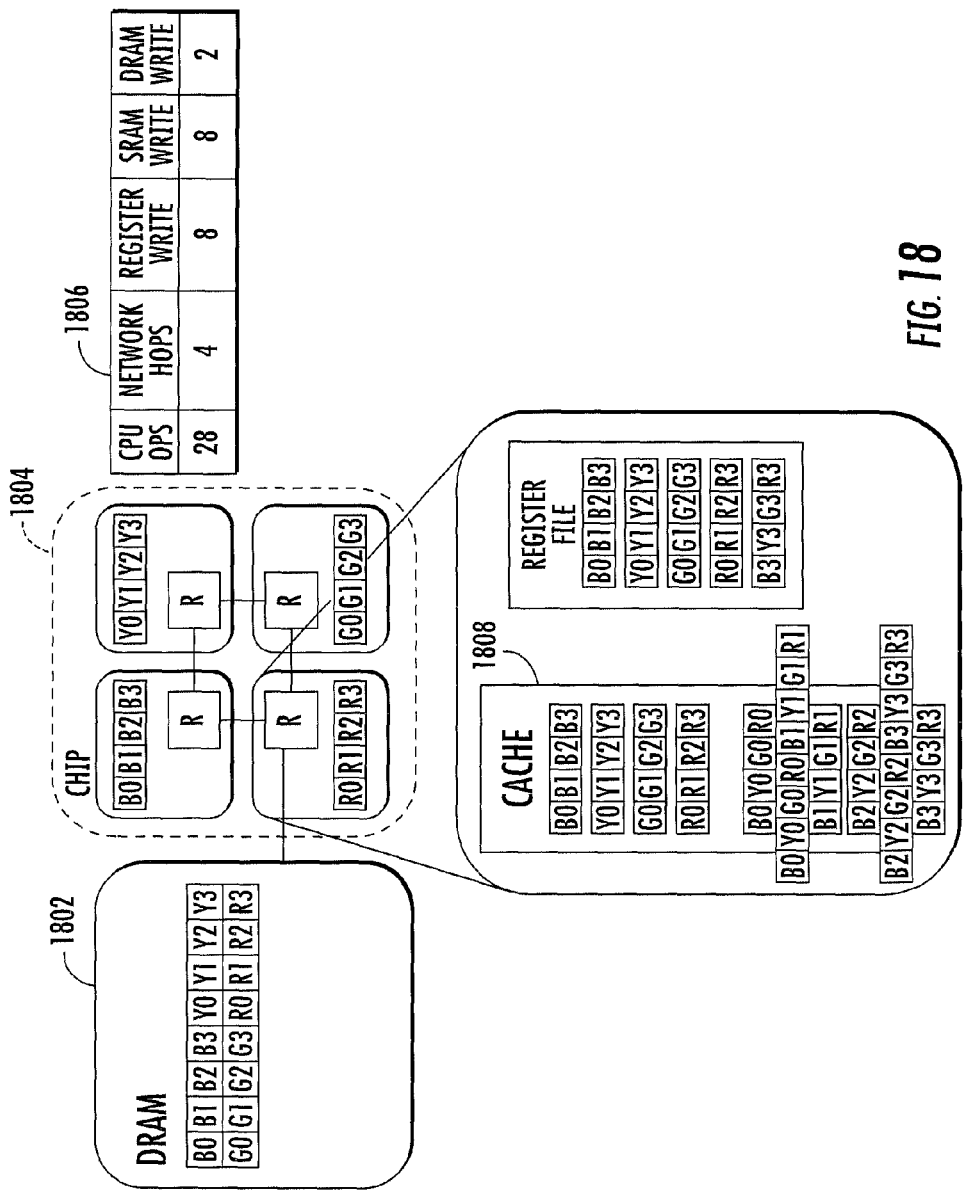

A transpose operation is further illustrated in FIG. 11 as shown by 1100. FIG. 11 shows a multi-core micro-processor chip including internal routing between the cores. In FIG. 11, each processor (1106, 1108, 1110, 1112) of 1102 is shown as starting with one row of data to be transposed with the others as illustrated by the resulting data configuration of 1104. FIGS. 12-18 show the multi-core micro-processor chip (1204, 1304, 1404, 1504, 1604, 1704, 1804) coupled to an external Dynamic Random Access Memory (DRAM) (1202, 1302, 1402, 1502, 1602, 1702, 1802) implementing the transpose operation with only electrical interconnections. In the packet switched network of those figures, each processor core starts with one row of data to write back transposed with the others. The figures show detail regarding the row data reorganized in the cache 1308, 1408, 1508, 1608, 1708, and 1808, in order to perform the transpose operation. As illustrated in the figures, a number of CPU operations are needed to move the data as illustrated, in order to complete the transpose operation. The number of CPU operations illustrated is shown in the figures as 1306, 1406, 1506, 1606, 1706, and 1806. The approximate number of CPU operations is conservative. In reality, four individual processors are executing the operations shown. Because of electrical technology constraints that will be discussed, the distributed transpose operation is very difficult to execute efficiently and results in important operations such as the two-dimensional Fast Fourier Transform (2D-FFT) paying a huge overhead. State-of-the-art multi-core processors perform the matrix transpose by aggregating data in one or several locations in a memory to perform the transpose, which requires a great deal of time and electrical power. The processors are limited by their electrical interconnect, which requires hierarchical, or hop-by-hop mesh networks to transmit data.

Figure 19:
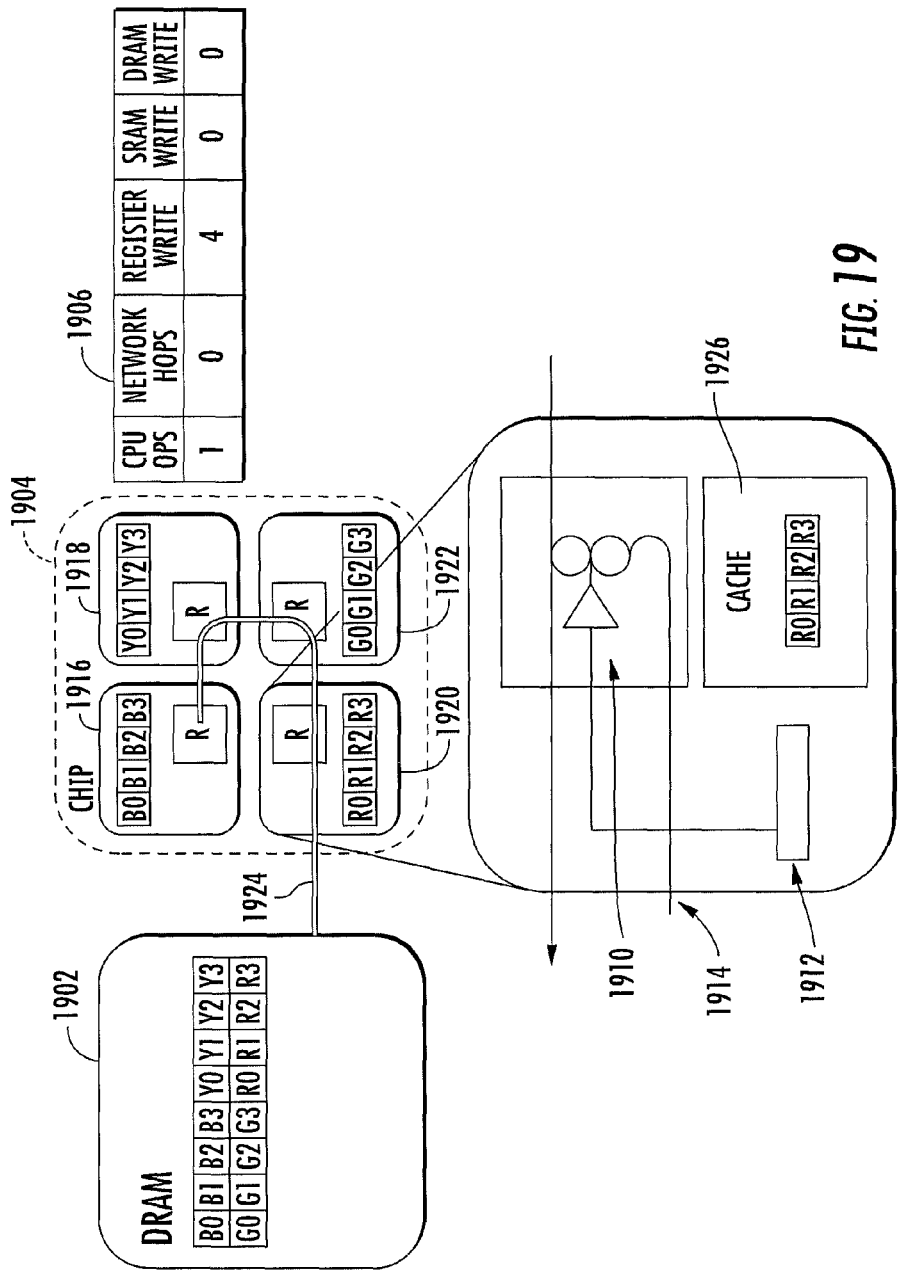
Figures 21A, 21B:
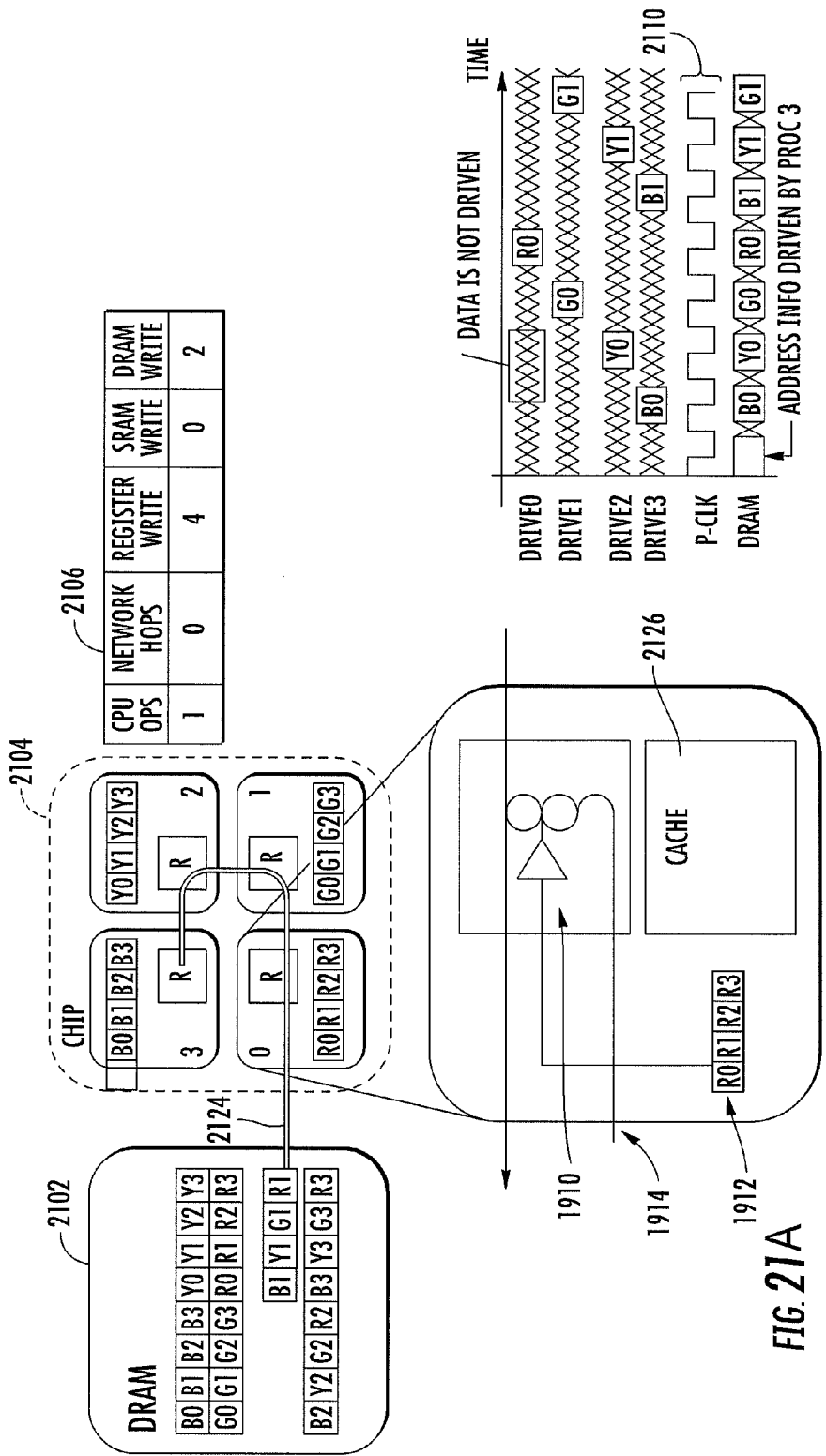

In contrast, as illustrated in FIGS. 19-21, a linear, shared on-chip photonic interconnect can significantly reduce the complexity of this operation by tightly sequencing memory reads or writes between individual processor cores to effectively perform an in-flight matrix transpose. A large number of processor cores may be incorporated on a chip (1904, 2004, 2104), connected with a photonic waveguide (1924, 2024, 2124). The processors (e.g., 1916, 1918, 1920, and 1922) may be tightly synchronized using a photonic clock, a signal that is periodically broadcast on the waveguide, to ensure that the cores are synchronized in order to share the photonic waveguide. As shown in FIG. 19, the processors may comprise a stage register 1912 coupled to a ring driver 1910. The ring driver 1910 may be coupled to an optical driver 1914 and the photonic waveguide 1924. The processors may comprise a cache (1926, 2026, 2126). By synchronizing the writes of individual pieces of the aggregate data, the processors of FIGS. 19-21B can synthesize a monolithic access to a memory resource, such as a DRAM (1902, 2020, 2102) external to the processor chip (1904, 2004, 2104). From the DRAM perspective the access appears to come from a single processor core, and the matrix transpose has been performed while the data was in-flight on the waveguide. As shown in FIGS. 20B and 21B, a full DRAM row write may be synthesized by tightly synchronizing TDM channels on the waveguide. The photonic waveguide may carry both data and an optical clock (2010, 2110). The number of CPU operations illustrated is shown in the figures as 1906, 2006, and 2106.

As illustrated by the comparison 2202 shown in FIG. 22, the photonic interconnect allows for huge gains in efficiency. The photonic interconnect allows for tight sharing of the DRAM channel and thus allows an increase in system performance, as the processors spend less time stalled, allowing for a decrease in energy as there are fewer register and Static Random Access Memory (SRAM) writes.

One step up in abstraction from the matrix transpose is the domain of compute kernels, which are macro operations that utilize fundamental mathematics to achieve important computation goals that contribute to the successful implementation of applications. One such important application kernel is the Fast Fourier Transform, or FFT, which is ubiquitous in modern signal and image processing applications. As important as this application is, it has stymied general purpose computing due to the high data non-locality inherent to its processing. This non-locality requires frequent and costly data reorganizations that essentially precludes the use of general purpose electrical computer hardware to perform the operation. By removing the data locality constraint, this important application kernel may be accelerated, and this may be done more cheaply and simply than with an analogous electrically interconnected system.

The essential drawback inherent to electrical interconnect that hampers these operations is distance dependence—e.g. that it is expensive to move data over significant distances. To overcome this in general-purpose computers, and more specialized computers such as Graphics Processing Units (GPUs), many manufacturers have resorted to heroic and often expensive measures to ensure that relevant data is local to its processing site. For example, U.S. Pat. No. 7,492,368 B1 describes dedicated hardware that aggregates memory accesses based on many requests to achieve higher efficiency. The novel techniques described herein may obviate the need for such specialized data aggregation hardware by globally synchronizing access requests in the communication network.

A machine architecture that uses in-flight data reorganization to efficiently compute arbitrarily-sized Fast-Fourier Transforms (FFTs) is now described. This machine will utilize distance independence and ease of global synchrony afforded by photonic links to perform a complex communication and computation task much more efficiently than would be possible using electrical interconnect.

The FFT process is composed of a number of successive stages of computation among a set of data samples that eventually converge after a number of rounds on the frequency-domain values that represent the time-domain sequence. The size of an FFT operation is defined by the number of data samples or points that are computed. The number of input samples equals the number of frequency bins in the output. Thus, a larger number of sequential input values results in a higher fidelity frequency-domain representation of the input data stream. Therefore, it is usually advantageous to consider a large number of input samples.

The Cooley-Tukey FFT is an algorithmically fast method to compute the Discrete Fourier Transform (DFT), which is a translation of time-domain data from a sensor or other data source to a set of frequency-domain components. It is critical in signal processing algorithms, as it is often easier to perform operations in one domain or the other.

Figure 23:
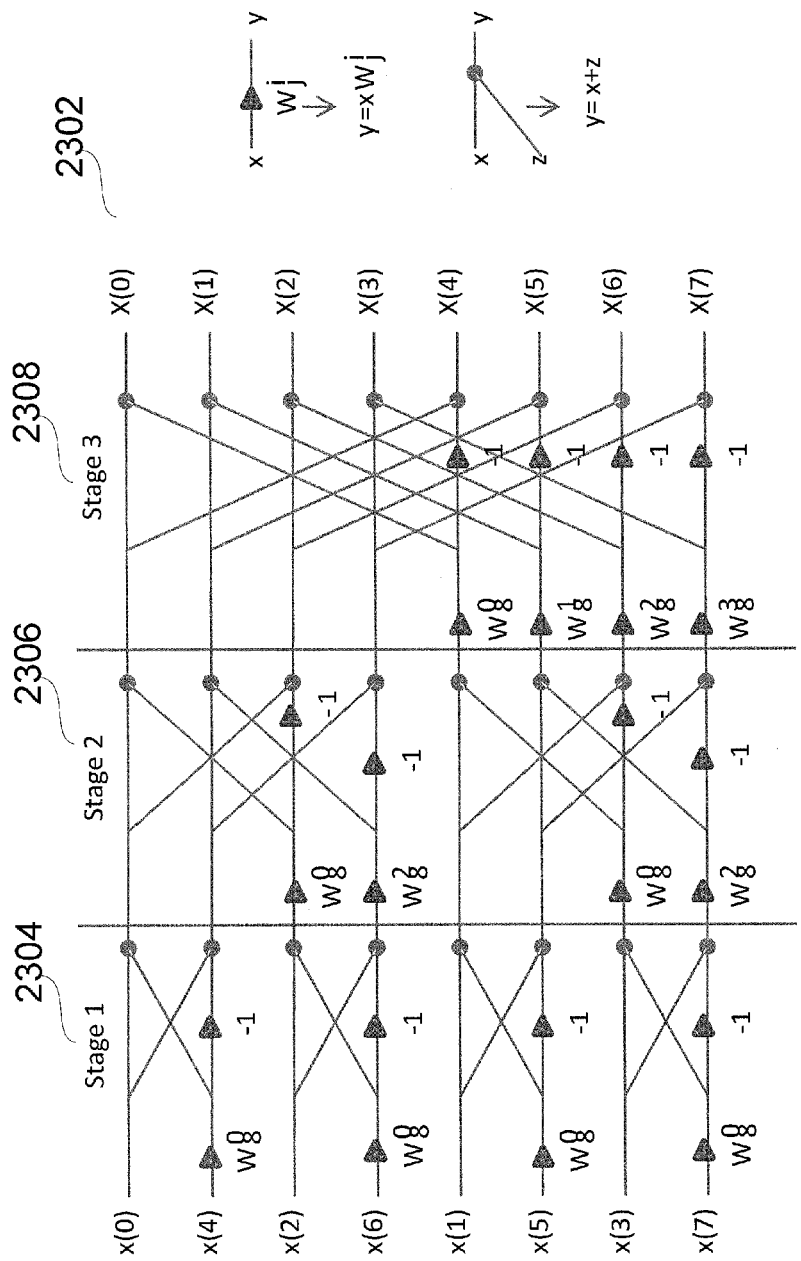
FIG. 23 is a representation of a decimation-in-time Cooley-Tukey FFT.

Turning to FIG. 23, an 8 point decimation-in-time Cooley-Tukey FFT is represented as 2302. In that illustration, the operation is performed in $\log_2 N$ stages where N is the number of points to be computed (N=8). In this case, each of the 3 stages, 2304, 2306, and 2308, involves eight multiplies (four are trivial multiplications by −1) and eight additions to compute. In each stage, the half of the incident data is multiplied by complex values and then added or subtracted with other values elsewhere in the stage. The criss-cross data flow pattern is often called a butterfly, and becomes more wide reaching with each successive stage.

Hardware to compute this operation is relatively simple, and is comprised of a multiplier circuit and an adder circuit. Also, a memory is necessary to hold the initial, intermediate, and final values in the computation. The full FFT can then be computed by performing the multiplies in each stage sequentially, then the additions, over all stages. However, there is an opportunity to take advantage of the structure of the computation to achieve a speedup. For example, a processor may be defined as a hardware circuit that has a memory storage unit, both a multiplier circuit and an adder circuit that can take two values from the memory, multiply or add them, and then store the result back in the memory. If two processors are available, the computations in the first two stages may be performed in parallel, since there is no data dependency between the upper four samples or their computational decedents and the lower four samples until the third stage. Thus, half of the work of two stages could be performed locally on each processor without outside interaction. The speedup, or factor by which the computation time improves, should be 2. In the third stage however, each of the processors requires all of the data from the other processor to compute its computation. Due to the nature of the FFT algorithm, the data accesses have become non-local to any one processor.

This non-locality can be quite costly when processors are connected electrically. The delay between the assertion of a signal on an electrical wire and the reception of that signal grows quadratically with wire length. Consequently, long-distance communication on modern silicon chips is avoided at extreme cost in terms of silicon real-estate and power. In the absence of interconnect delay, scaling the two processor case up to four, eight, or more processors would result in a proportional speedup (up to the limitations of the algorithm), but the effect of adding more processors is that the wires between them tend to grow longer, resulting in added communication latency that reduces the speedup significantly.

The property of the FFT data pattern that significantly reduces the benefits of parallelism is non-locality of data accesses. Because computation hardware of any sort occupies space, higher degrees of parallelism tend to increase the number and length of wires in the system. Unless an algorithm can be tuned to only communicate over short wires—that is, between adjacent processors—communication latency becomes a dominant factor in performance. Unfortunately, the FFT described here involves increasingly non-local communication. Algorithm designers employ a number of tricks to palliate this situation, one of which is described below.

An FFT begins with a linear array of data elements that represent the value of a signal over a period of time. The values are calculated en masse and every data element eventually directly influences the frequency domain output by feeding into the diffusive butterfly network. In effect, this is a single step (though multi-stage) process. Here, this process is referred to as a 1-dimensional (1-d) FFT. As mentioned earlier, the 1-d FFT suffers from increasing non-locality in communication. Fortunately, there are tricks to minimize, though not eliminate this cost in electrical systems. The price in logic and power will still be high (sometimes prohibitively), but not quite as high as performing all of the communications mandated by the butterfly pattern.

The method focused on here minimizes and contains long-distance communication by refactoring the data into a multi-dimensional structure. This results in an FFT computation that costs extra computation, but results in no inter-processor communication. However, the bottleneck is still in the communication, which takes the form of one or more matrix transposes. The process is illustrated in FIG. 24 which illustrates a representation of a computation of a 2-cubic FFT.

Figure 24:
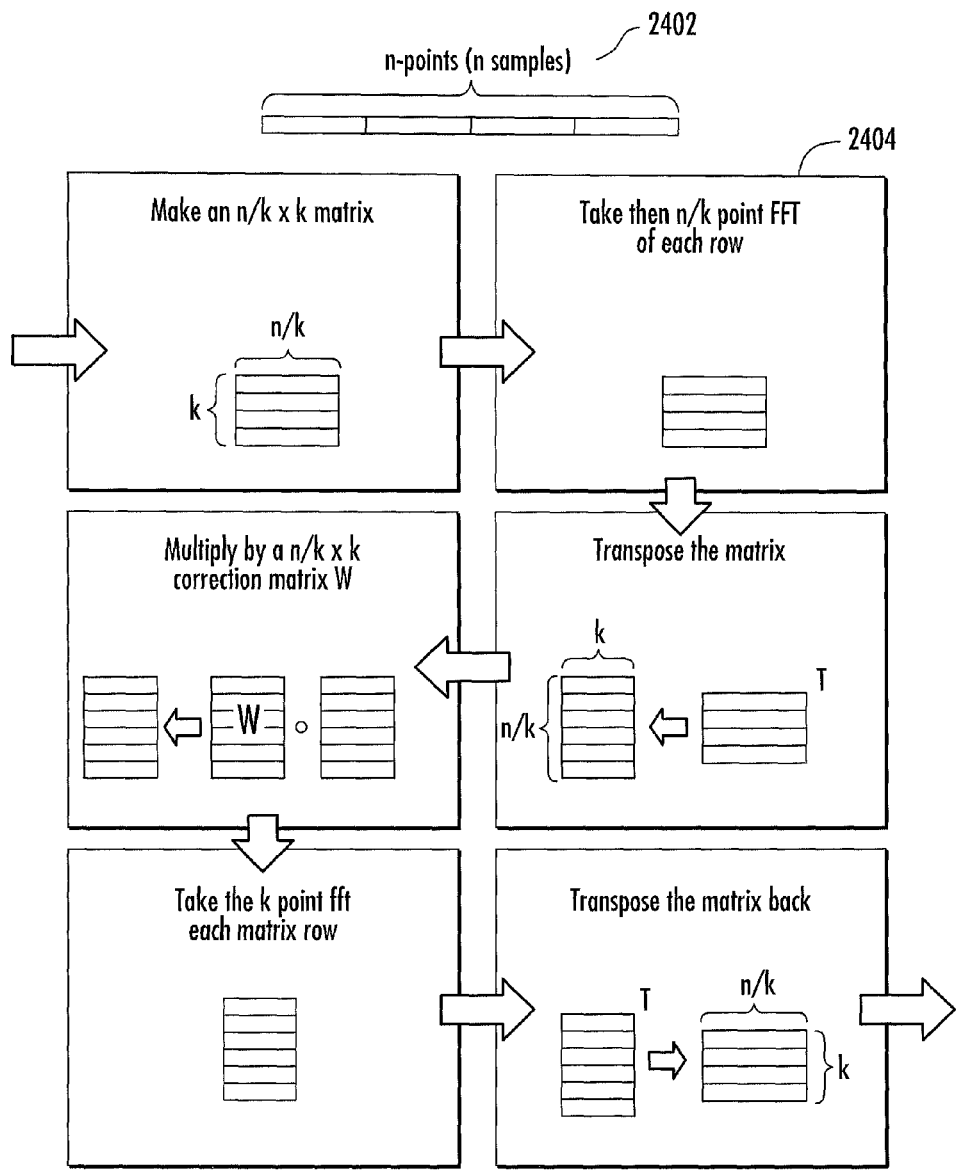
FIG. 24 is a representation of a Computation of a 2-cubic FFT.

FIG. 24 begins with 2402, an n-element array of time-domain data. Since the goal of this method is to maximize locality, it is necessary to limit the scope of computation to the number of data elements that can fit in the processor's local memory. It is possible to perform $\log_2 S_m$ stages of the FFT, where $S_m$ is the size of the local memory in data samples, before the computation requires non-local communication. The multi-dimensional refactoring takes this into account by organizing the 1-D data as a k-D (potentially truncated) cube.

Although cubes are three dimensional in real life, a >3-d cube, as referred to here, is an extra-dimensional hyper-cube. The computation will then be broken up into a series of k computation steps, and k, or k−1 re-organization (transpose) steps. It is important to note that even in this formulation the computation requires the same number of butterfly stages. However, an extra multiplication by a complex correction matrix is required after each transpose step.

The transpose is still problematic however, as 2404 illustrates that nearly every data element be re-located prior to the next computation step, but it is far preferable to the alternative which is that every element is re-located on every remaining stage after non-locality of communication is reached (after $\log_2 S_m$ stages). This is difficult principally because electronic memory arrays have preferred access pattern.

In many applications, accessing data element i in a memory array implies that you will eventually want data element i+1. Therefore, memory devices are constructed such that reading element i reads elements i through i+j, where j is the memory row size, and represents the minimum amount of data that is accessible. This arrangement is usually very efficient when the memories are arranged in a hierarchy, such that the row can be locally stored in a smaller, potentially faster memory more local to the processor, amortizing access cost. This row-based access scheme is rendered ineffective when faced with the access pattern inherent to a matrix transpose.

Rows in a memory are accessed by specifying an address A. Elements subsequent to A are denoted with array notation, so a data element that is two away from A would be denoted A[2]. If we assume that a row is $S_m$ data elements long, an efficient access pattern would be monotonic: A[0], A[1], A[2], etc. If $S_m$=8, then the cost of reading A[0] through A[7], assuming A is row aligned is the same as reading A[0] alone. In a hierarchical memory system, the entire row A[0] through A[7] would be stored in another memory closer to the processor, and subsequent accesses to A[1] through A[7] would not incur the cost of an access to the original memory. If, however, the data pattern is strided, as when turning matrix rows into columns and vice versa, the access pattern may be like the following: A[0], A[$S_m$], A[$2S_m$] etc, each of which pays the price of a read of a full row, but likely will only be able to store a few elements in more local caches (because they are almost always much smaller). Thus, worst case, to transpose a $S_m$ by $S_m$ matrix will require $S_m^2 - S_m$ full row reads. In effect, in the context of the transpose, common architectural enhancements result in gross inefficiency.

As discussed above, transposes are a fundamental linear algebraic operation. Therefore software and hardware engineers have devised tricks to dissipate, though in no way eliminate the pain of performing the operation. To see one way that this is done, consider the transpose operation in FIG. 25.

Figure 25:
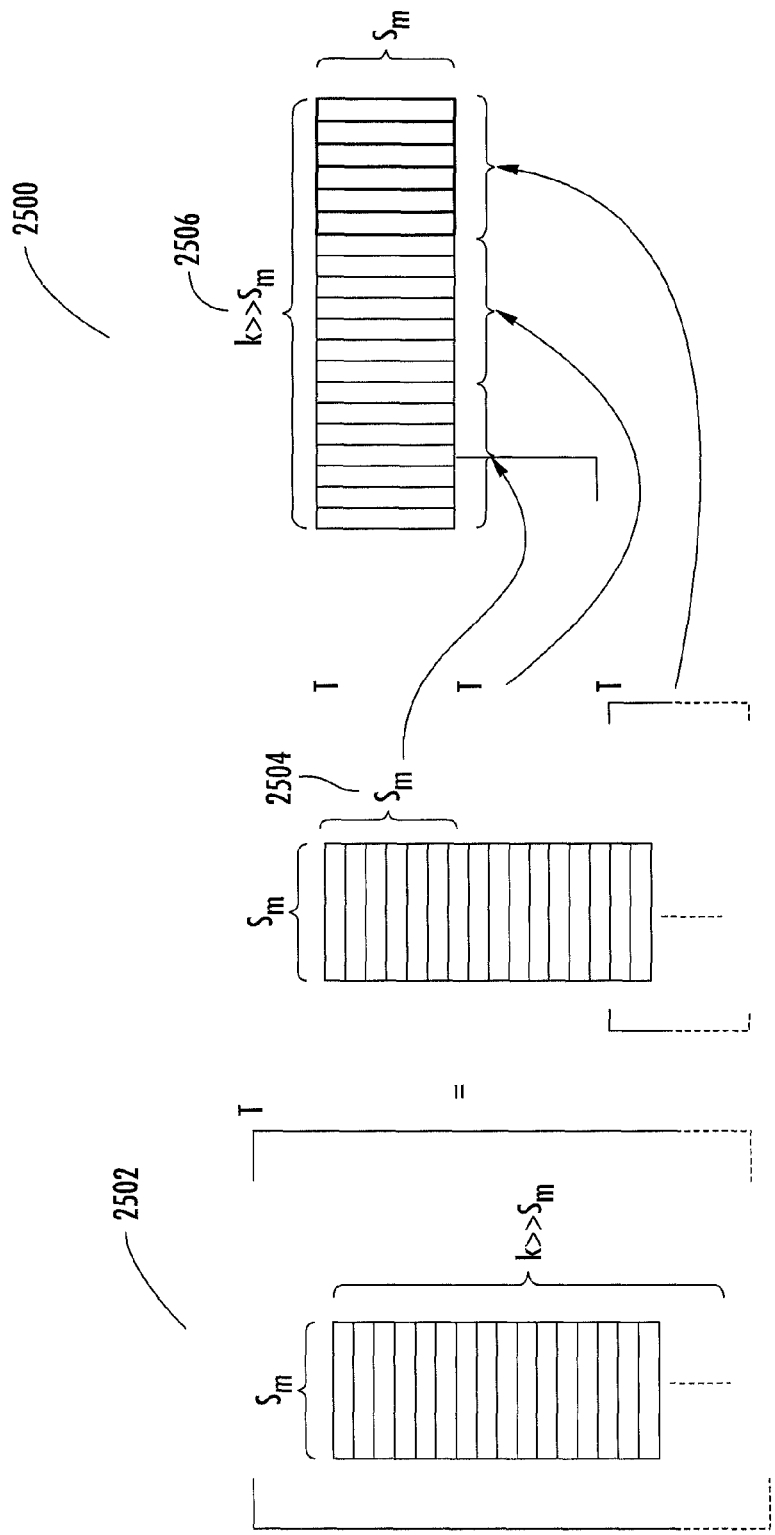
FIG. 25 is a representation of a block-wise transpose operation.

FIG. 25 2500 is a representation of a block-wise transpose operation. FIG. 25 shows a $S_m \times K$ set of samples 2502 is stored in a memory with row size $S_m$. Assume that the processor that will transpose this data has a $S_m \times S_m$ data element local memory, and that it is much more efficient to perform element-wise accesses in this memory than to perform them in the larger external memory that holds the entire data set. The processor performs K/$S_m$ individual $S_m \times S_m$ element transposes, writing out $S_m$ rows 2504 to the external memory after each transpose, resulting in a K×$S_m$ transposed matrix 2506 in the external memory. The net result is near optimal accesses to the external memory at the cost of a local memory that can hold $S_m \times S_m$ elements, and simply replicates data closer to the processor.

The need for local storage to avoid small long-distance communications has an impact on the degree to which the FFT algorithm can be parallelized. Consider an n-cubic FFT formulation where each dimensional diameter is $S_m$ samples. Assuming that an optimal write to the memory external to the processor is $S_m$ samples, the minimum number of $S_m$ sized lines in any local memory must be $S_m$, therefore the local memory is optimally $S_m \times S_m$. In the simplest case, where each of N processors has an $S_m \times S_m$ local memory, to optimally perform the transpose, each processor must have $S_m$ rows of the n-cube of data. Therefore, for the first parallel FFT phase, to avoid sub-optimal external memory access, a maximum of $$\left\lceil \frac{N}{S_m} \right\rceil$$

processors may be used. Architectural methods to mitigate this problem, namely the sharing of the local memory amongst multiple processors, but this is spatially limited, and requires advanced arbitration logic.

As previously discussed, the FFT operation is quite costly in a parallel, electrically interconnected multi-processor due to the extreme non-locality of its computation. This non-locality requires increasingly global communication as the computation progresses. Global communication is very costly in terms of power and time in electrical systems due to the high cost of long-distance electrical communication. Many tricks and optimizations have been devised to mitigate this, though all require more logic and power to achieve high performance (usually speed).

The primary trait of electronic interconnect that limits the performance of algorithms such as FFT is wire delay. Wire delay is caused by the fact that electronic wires tend to have a capacitive relationship to other structures near them. A capacitive relationship is a relationship in which the charges passing through the wire experience an electromagnetic force that tends to pull them toward opposite charges on nearby structures, such as wires. The net result is that sending a signal over a wire is not as simple as injecting them on one end, and catching them at the other after $$\frac{d}{V_e}$$

seconds, where $V_e$ is the velocity of the electron in the wire and d is the length of the wire. This so called flight-time is a component of wire delay, but at long distances it is not dominant. Rather, the capacitive relationship between the wire and its surroundings results in the wire behaving like a storage unit. To transmit a signal from one end to the other requires that the storage unit (wire) be charged over time. The duration of this charging period depends on the product of the wire's capacitance (C), and its resistance (R) which is a property that describes how readily charge moves in the wire. Both R and C increase proportionally with added wire length; hence there is a quadratic increase in wire delay as signaling distance increases.

In contrast, a photonic waveguide of whatever medium, whether silicon or even free space, does not exhibit this charging behavior, and its signaling time is only dependent on the speed of light in the medium. For the purposes of this description, the major difference between electrical and photonic interconnect is therefore distance independence. While distance in the electrical waveguide does matter, in that the waveguide does exhibit scattering that diminishes the strength of the signal (this is analogous to the R parameter in the electronic wire), the speed is not affected, and the dissipation is only relevant at very long distances.

The result of distance dependence in the electrical system is that data has locality constraints. To meet a particular performance goal, data must be sufficiently close to the processing logic (earlier, the multiplier and adder) to be quickly consumed. This has necessitated complex data delivery and local storage hierarchies that tend to occupy most of the real-estate on a chip. Some modern super-scalar high-performance microprocessors have less than 5% of their chip area dedicated to actually processing data. The rest is local and hierarchical storage and the logic to support it.

As will now be further discussed, the novel method and apparatus presented here will greatly reduce the need for such hardware overhead, resulting in smaller, faster, more energy efficient systems because it relaxes the data locality constraint. As will now be described, a photonic channel, when properly routed and scheduled, can drastically decrease the amount of hardware and power necessary to efficiently perform this task. Methods for performing the FFT in a photonically interconnected multi-processor are now described. The first is identical to the electronic n-cubic FFT, with the exception that the transposes are performed using in-flight data re-organization. The second, the Butterfly-in-Network (BiN) formulation utilizes the efficiency of photonic data reorganization to perform a pure butterfly-stage after butterfly-stage Cooley-Tukey FFT.

The photonic transpose, described elsewhere, is much simpler than the one described for the electrical system. In addition, it is much more power efficient due to its greater speed, as well as its greatly reduced need for data localization hardware. This reduction in hardware also permits a much higher degree of scalability in the architecture. To see this scalability, consider the system shown in FIG. 26.

Figure 26:
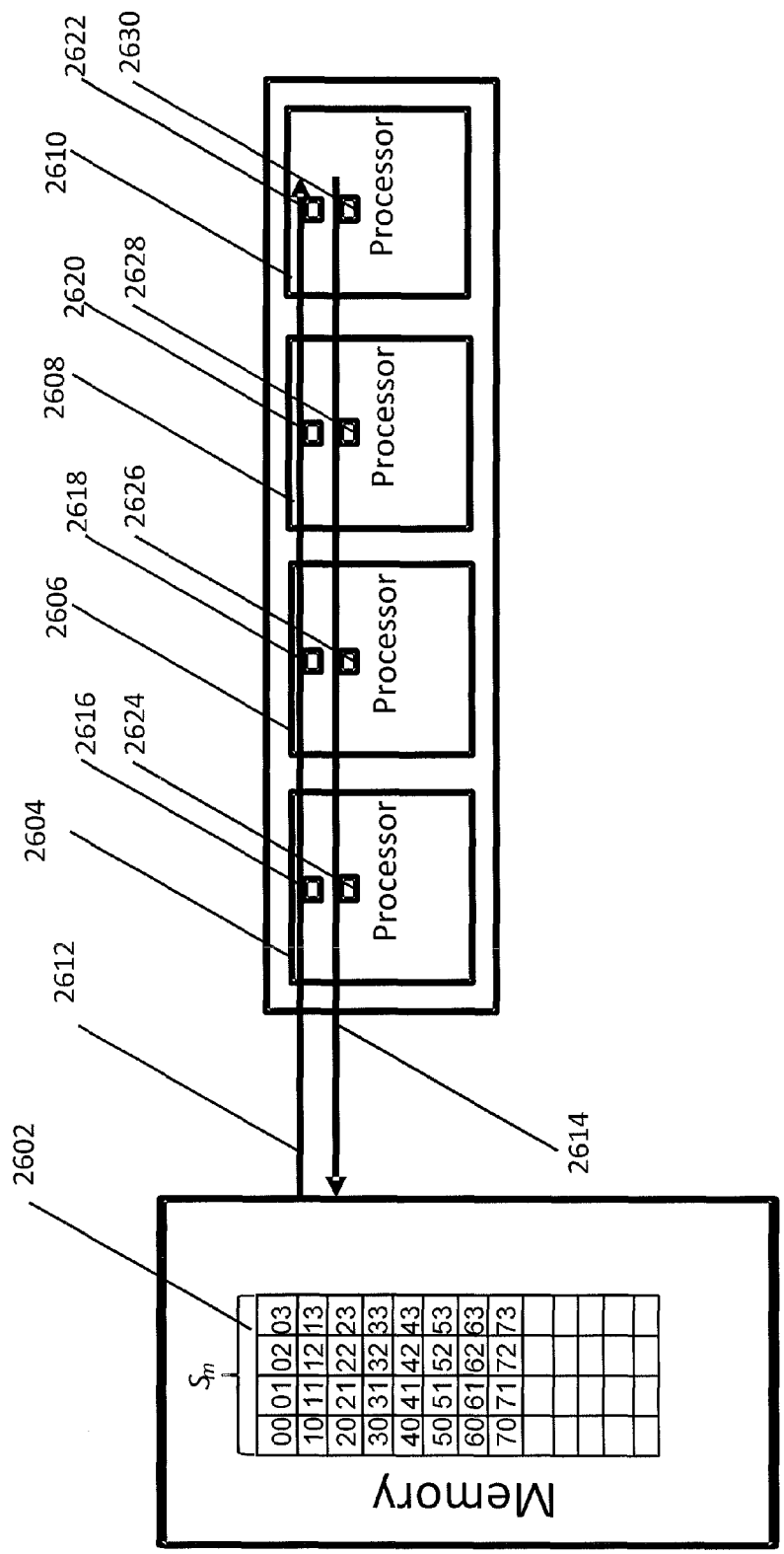
FIG. 26 is an example of a photonically interconnected system.

In FIG. 26, a memory 2602 with an optimal access size $S_m=4$ samples is connected to a system of four processors, 2604, 2606, 2608 and 2610 via two unidirectional photonic channels, 2612 (on which the Memory transmits and the processors receive) and 2614 (on which the processors transmit and the memory receives). Each processor has a receiver (2616, 2618, 2620, 2622) which directs some of the incident energy on 2612 to a photodetector, and a transmitter (2624, 2626, 2628, 2630) which modulates light already on 2614, or alternately injects light from a local source or another waveguide. The memory 2602 contains thirty-two samples which are the inputs to an N=32 point FFT, arranged in rows. Here, each processor has the same adder and multiplier that were specified earlier, but a much smaller local memory that has a total capacity of $S_m$ samples. Thus, the total memory in all the processors is $S_m^2$.

Figure 27A:
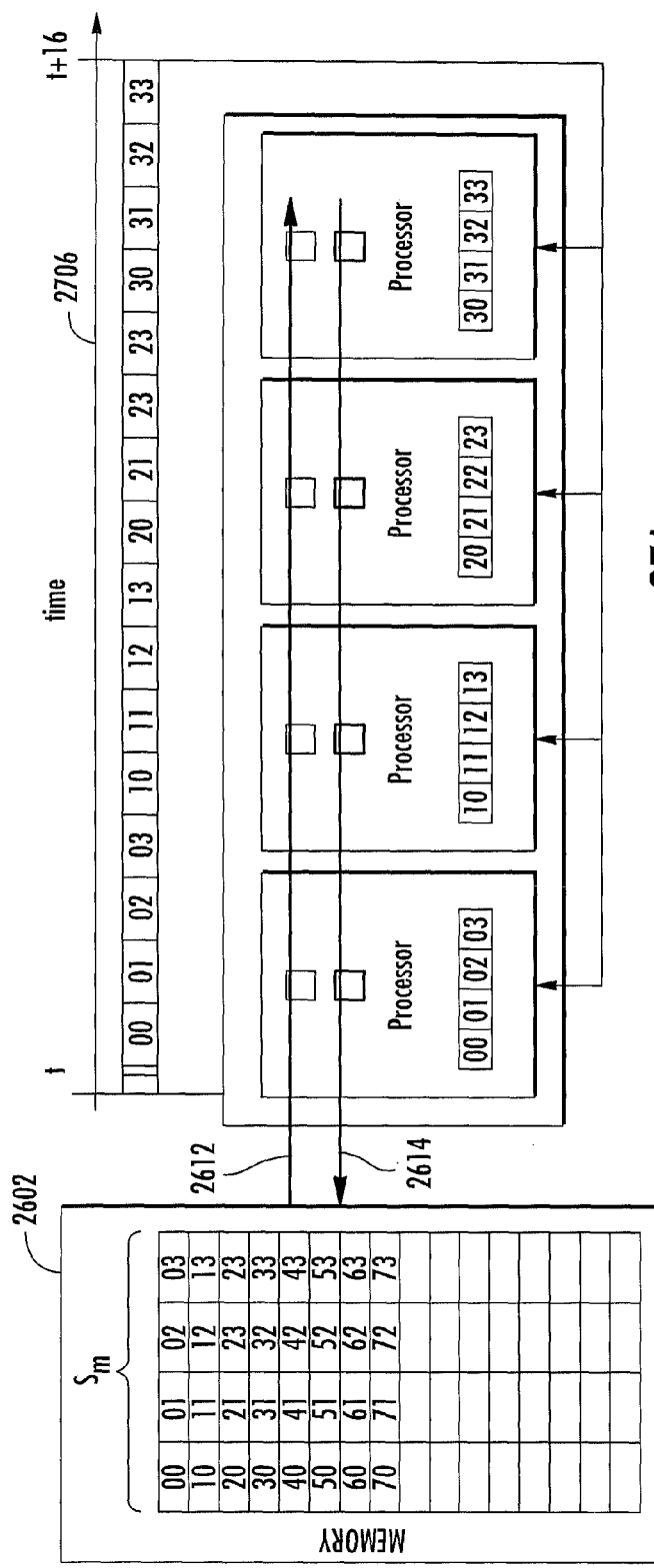
FIGS. 27A-C illustrate an FFT computation in hardware.
Figure 27B:
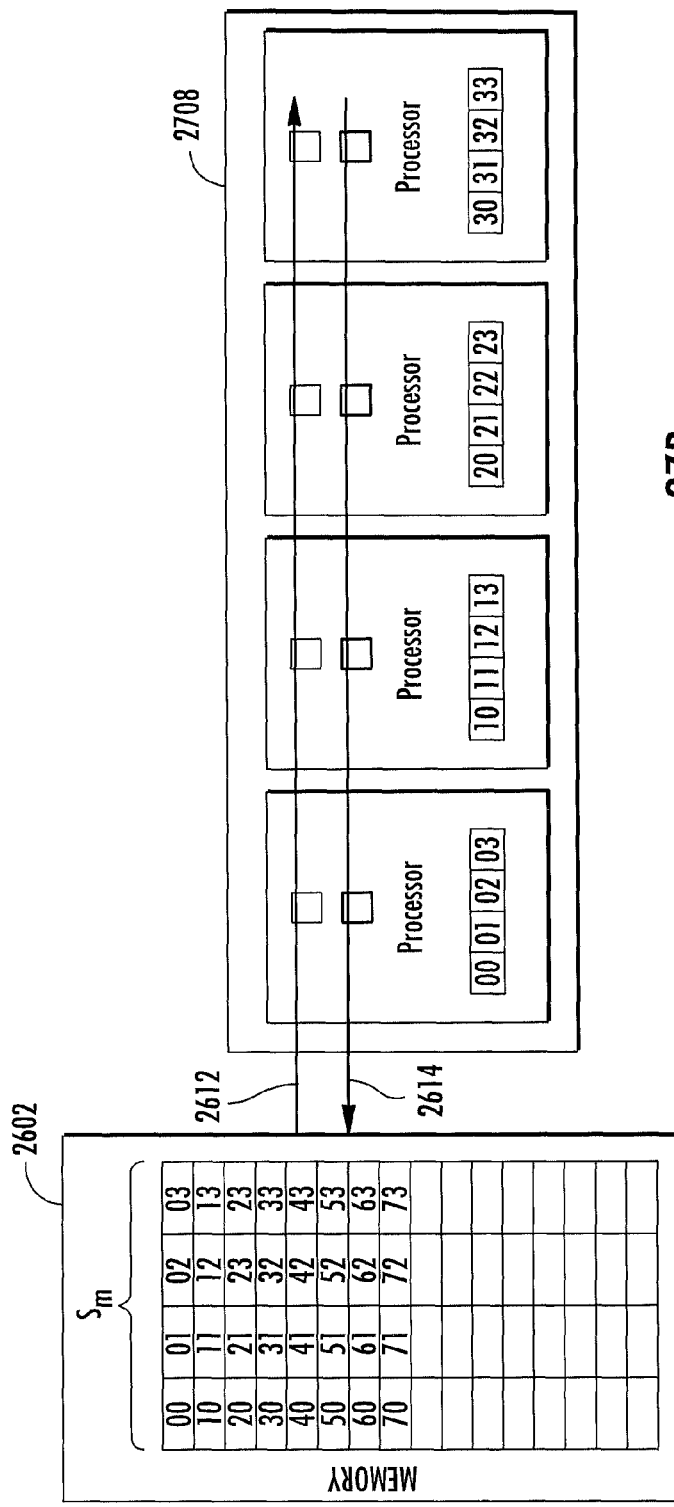
Figure 27C:
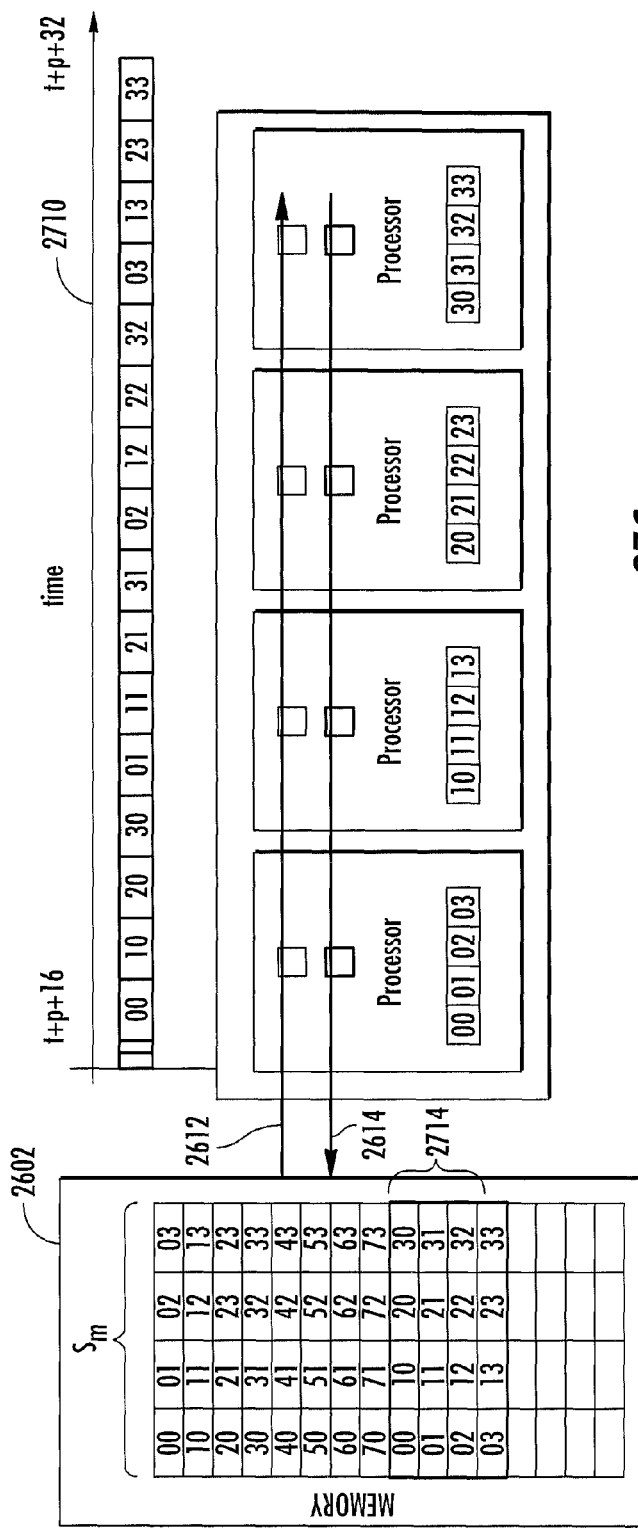

One step in the iterative n-cubic FFT is shown as three sub-steps in FIGS. 27A, 27B, and 27C. This three step process is repeated until all original data in the memory 2602 is processed and written back to the memory as shown in FIG. 27C. At that point, the first dimension of the n-cube has been processed. This sub-process is then repeated for the remaining dimensions. As shown in FIG. 27A, four optimal-sized rows are read en masse. This data access technique is called bursting, and is a feature of all modern memory systems. It is an extension of the row-optimality previously described. For various reasons, including better amortization of the cost of requesting data from the memory, it is more efficient to collapse transactions into long bursts. Here, this bursting capability perfectly complements the scheduled waveguide, as it can be used to perform an inverse in-flight re-organization, collapsing the requests of four processors into one long contiguous access. The processors then take data off of waveguide N at their appointed time. For example, 2706 illustrates processor memory state at a time t+16, 2708 illustrates processor memory state at a time t+p+16, and 2710 illustrates processor memory state at a time t+p+32. This results in a highly efficient access and data distribution to the whole processor set. From the perspective of the memory, a single processor made a burst request. As shown in FIG. 27B, the processors perform the local FFT computations in parallel, including multiplication by the correct elements of the correction matrix. The newly transformed data is shown as 2714. As shown in FIG. 27C, the data is written back to the memory 2602 from each of the four processors on waveguide 2614, and re-organized in-flight to realize a transpose of the aggregate data in the processor's memory. Again, as in FIG. 27A, from the perspective of the memory, a single four row transaction arrives.

Using in-flight data reorganization, the FFT can be performed in parallel with minimal memory, and high efficiency. This is in contrast to an electrically connected system which, to avoid individual element-wise sub-optimal accesses to the external memory, would have required either special request aggregation hardware to absorb a number of individual accesses, and then reformat them into one large access, or a memory shared amongst the four processors. In the end, these have similar costs, in that they both require an extra memory large enough to stage the burst access. The latter is unscalable because of the previously described wire delay, as it will only be feasible to fit a small number of processors around a single, shared memory.

One of the greatest benefits of the technique described herein is that it is highly scalable in terms of processors and problem size. FFTs of millions of points (and millions of samples) can be realized as efficiently as smaller FFTs without significantly impacting the requirements for in-processor memory storage. In addition, the number of processors can scale up to hundreds or thousands while still minimizing the communication cost in terms of hardware, time and energy due to relaxed locality constraints.

In the case of the n-cubic Cooley-Tukey FFT described earlier, the scalability has an extra impact. Because matrix transposes can be performed so cheaply, it is possible to trade off inefficient local memory for a higher number of transposes, by increasing the n-cube dimensionality, and decreasing dimensional diameter. In other words, by decreasing the local processor memory, one necessarily decreases the possible number of samples in a dimensional row. This decrease in diameter necessitates more dimensions, and therefore more transposes. This also results in more accesses to the RAM, though in-flight data reorganization makes these efficient by synthesizing bursts from the memory. The benefit is that in-flight data reorganization enables a very high degree of tune-ability, such that a single system can balance power and performance to a very fine degree, and across a wide dynamic range.

The boundaries of this scalability, in the context of processor array memory, are 2p elements on the low end, where p is the number of processors, and each processor can hold two data elements at one time, to >N elements on the high end, where N is the number of points in the FFT computation. In the latter case, the processors would each have at least $$\frac{N}{p}$$

elements of storage. Since on-chip memory is costly, the tendency will likely be to move toward the low end. In the following section, the extreme low-end computation is explored.

When each processor can hold only two elements, the n-cubic data structure becomes a binary (2-ary) ($\log_2 N$)-cube. Essentially, the number of dimensions equals the number of butterfly phases. The work to perform the communications should therefore be the same as the work to perform the actual butterfly operations, and then re-organize them in preparation for the next operation. However, the n-cubic formulation requires multiplication by correction matrices at each dimensional boundary, which is not required in the canonical butterfly formulation. Therefore, at some point on the dimensionality/memory continuum, it makes sense to consider simply performing the radix-2 butterflies in the network using in-flight data reorganization, as opposed to reformulating the data into an n-cube. Radix-2 refers to the fact that the butterfly has two inputs and outputs. A further extension of this idea could utilize high-radix butterflies of 4, 8 or more inputs and outputs. A radix-4 butterfly operation performs the same computation as two radix-2 butterfly stages (four radix-2 butterflies), but with less computation. Hereafter the technique of implementing the butterfly communication, in-flight, in the network, is referred to as Butterfly-in-Network (BiN).

Figure 28:
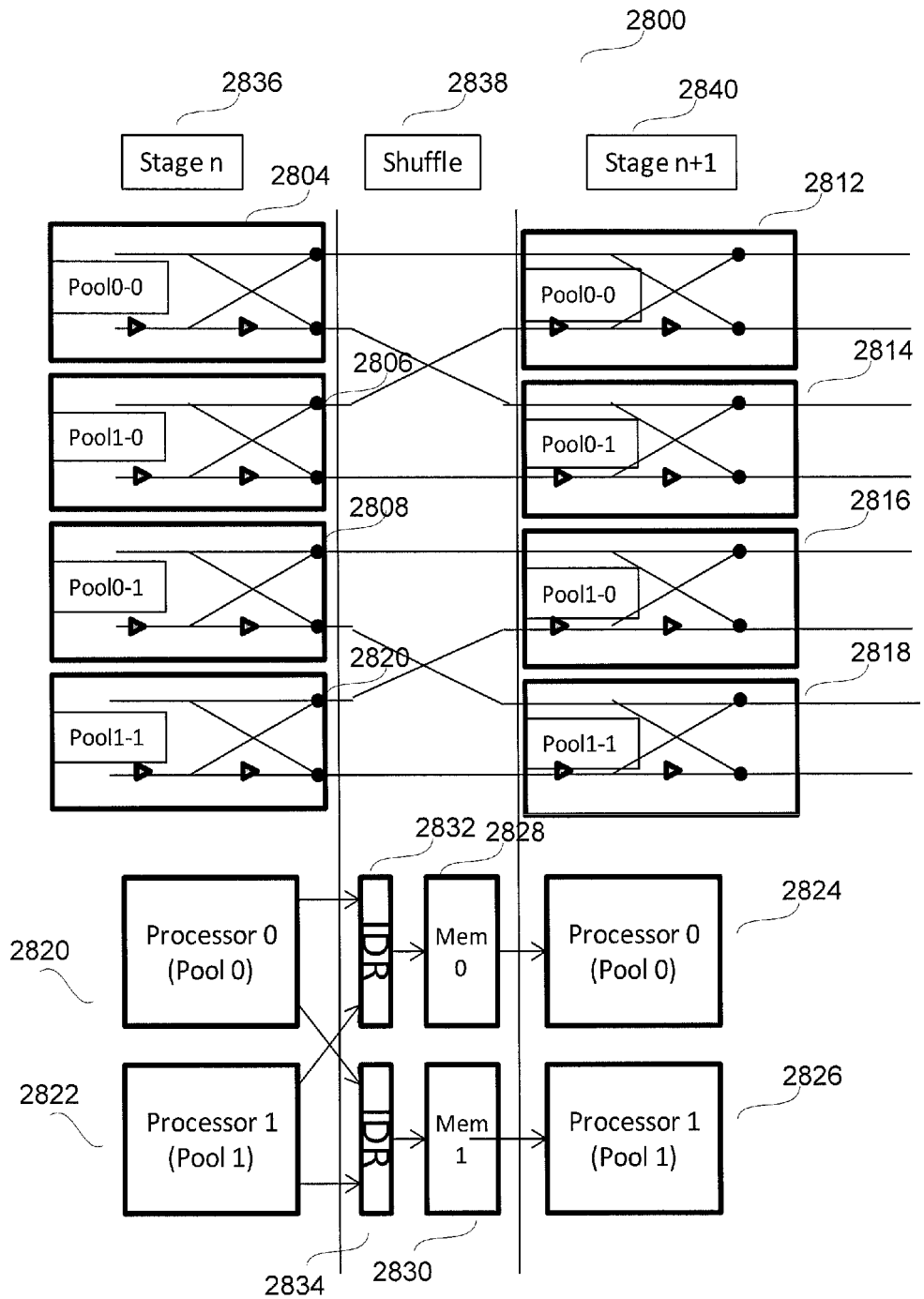
FIG. 28 illustrates mapping the FFT to processor and memory pools.

BiN is enabled by in-flight data re-organization because after each stage in the FFT, a data shuffle is required. Effectively, every butterfly except for the first requires input data from two different precursor butterflies. It is possible to schedule the butterflies such that the two precursors are in the processor array simultaneously. Thus, when the precursor butterflies are complete they can shuffle their data using in-flight data reorganization, such that the next stage requires a simple linear memory access. This requires that the processor set is broken up into k pools, where k is the radix of the FFT, and k independently accessible memory devices. This arrangement and the memory accesses are shown in FIG. 28.

The process 2800 begins when each of the n processors performs a linear read of the memory space in stage n (2836), where processor pool 0 (2804, 2808, 2812, 2814) reads from memory 0 (2828), and processor pool 1 (2806, 2810, 2816, 2818) reads from memory 1 (2830). The processors read only as many samples as they can store locally. The processors in each pool then process their data by performing butterfly operations. In the radix-2 case, while each processor can compute multiple butterflies, they must all be in the same stage. Computing several stages at once reduces to a higher radix FFT. Once all processors are done computing their butterflies, each pool shuffles 2838 its resultant data, sample by sample with the other pool, and writes each even shuffled set of two samples to memory 0 (2828), and each odd set of two shuffled samples to memory 1 (2830) using in-flight data reorganization (labeled IDR, 2832 and 2834, in FIG. 28). At this point, the rest of the FFT stage can be computed by repeating this process for the rest of the n FFT samples. When the stage 2840 is complete, the data samples are arranged in each memory such that a linear read by any one processor pool will retrieve the data in the proper order for computation. This process can be repeated for each subsequent stage of the FFT.

The BiN FFT is suitable for when the processor set has very limited local memory. While in-flight data reorganization results in much lower-power and latency burst accesses, the BiN limit represents a maximum in the number of external memory accesses, as there is a memory write after each phase of a stage computation. Both BiN and the n-cubic formulation of the FFT result in fast communication with much less support hardware. It allows the tradeoff of on-chip (local to the processors) and off-chip (in a large DRAM array) accesses by alleviating the problem of high communication costs.

A physical machine that could realize the preceding communication and computation patterns is now described. The machine utilizes a synchronous photonic waveguide, along with tightly scheduled communication nodes to effectively and efficiently perform the FFT computation.

A highly flexible, phased computation technique that utilizes in-flight data reorganization was described above. This will serve as the underlying technique for either a BiN or n-cubic FFT formulation. In the system described below, communication has been elevated in the programming model to a status at or even above the level of computation.

In many computer systems, communication is handled exclusively by the physical interconnect hardware. Such systems, especially those connected with packet-switched networks generally employ a "fire-and-forget" policy of communication. In that policy, a local processor will send data into the network with no exact guarantee of when the data will reach its destination. This uncertainty results from the effects of contention for the interconnect resources, and is a direct result of the difficulty of scalable global scheduling when using electronic interconnect. Some systems do expose the particulars of communication upwards to the processing stack, ostensibly to allow tighter trade-offs between communication and computation, but the uncertainty inherent to large packet-switched interconnects limits the effectiveness of this technique.

In contrast, the photonic channel described above facilitates tight scheduling due to the distance independent nature of photonics and the resulting ease of global synchrony. It is therefore possible to fuse computation with communication to achieve maximum hardware efficiency and performance. This implies that communication must be described at a similar level of detail as computation. However, the tight interaction between computation and communication does not mean that these functions are carried out in the same functional hardware unit. If so, it would be difficult to parallelize these operations, reducing apparent latency. Rather, the hardware units responsible for communication and computation in each processor must operate in tight synchrony.

Modern computer systems are comprised of relatively inflexible hardware that efficiently runs flexible software. The software generally is quite explicit about the computation operations, but the method by which data is stored and retrieved from either other processors or memories is implicit, and is usually handled by hardware. However, in the system described below, the communication is quite explicit, and is described by a Communication Program.

Figure 29:
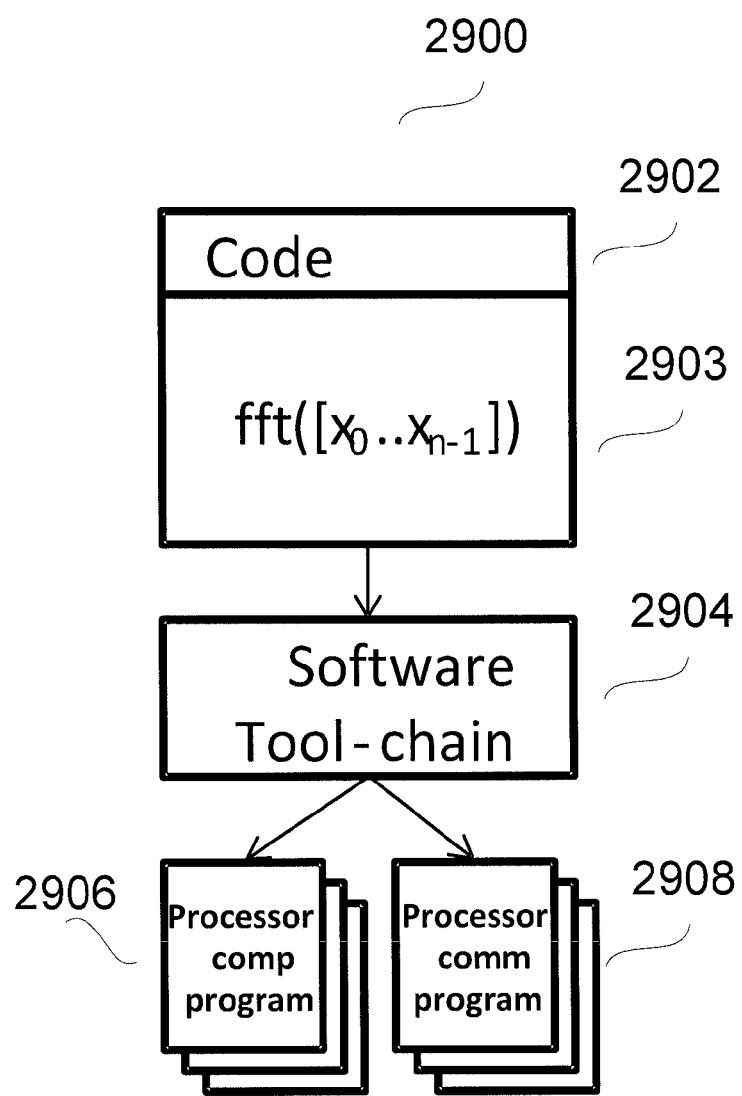
FIG. 29 illustrates derivation of programs from code.

The Communication Program is a simple schedule that is loaded in every processor by the hardware unit responsible for communication on the waveguide. Turning to FIG. 29, an illustration of the derivation of programs from code is shown. In FIG. 29, processor Computation and Communication programs, 2906 and 2908, are shown as derived from high-level operational code 2902. The programs are derived in much the same way that the individual computations required by a multi-processor's processing elements are derived. In FIG. 29, a high-level instruction which specifies that the FFT of an arbitrarily-sized array of data should be computed is fed into a software tool 2904, or chain of tools that derives two sets of programs, 2906 and 2908. These programs are formed such that they are synchronous to a propagating waveguide clock and therefore to each other.

The programs are derived from the FFT 2903, and are divided into phases that correspond with different phases of the FFT computation. Since the input array is arbitrarily sized, it is not possible to guarantee that all samples could ever fit in on-chip memory, therefore, the inner FFT computation which is highly parallelizable on distinct rows of the n-cubic data will likely have a loop.

Figure 30:
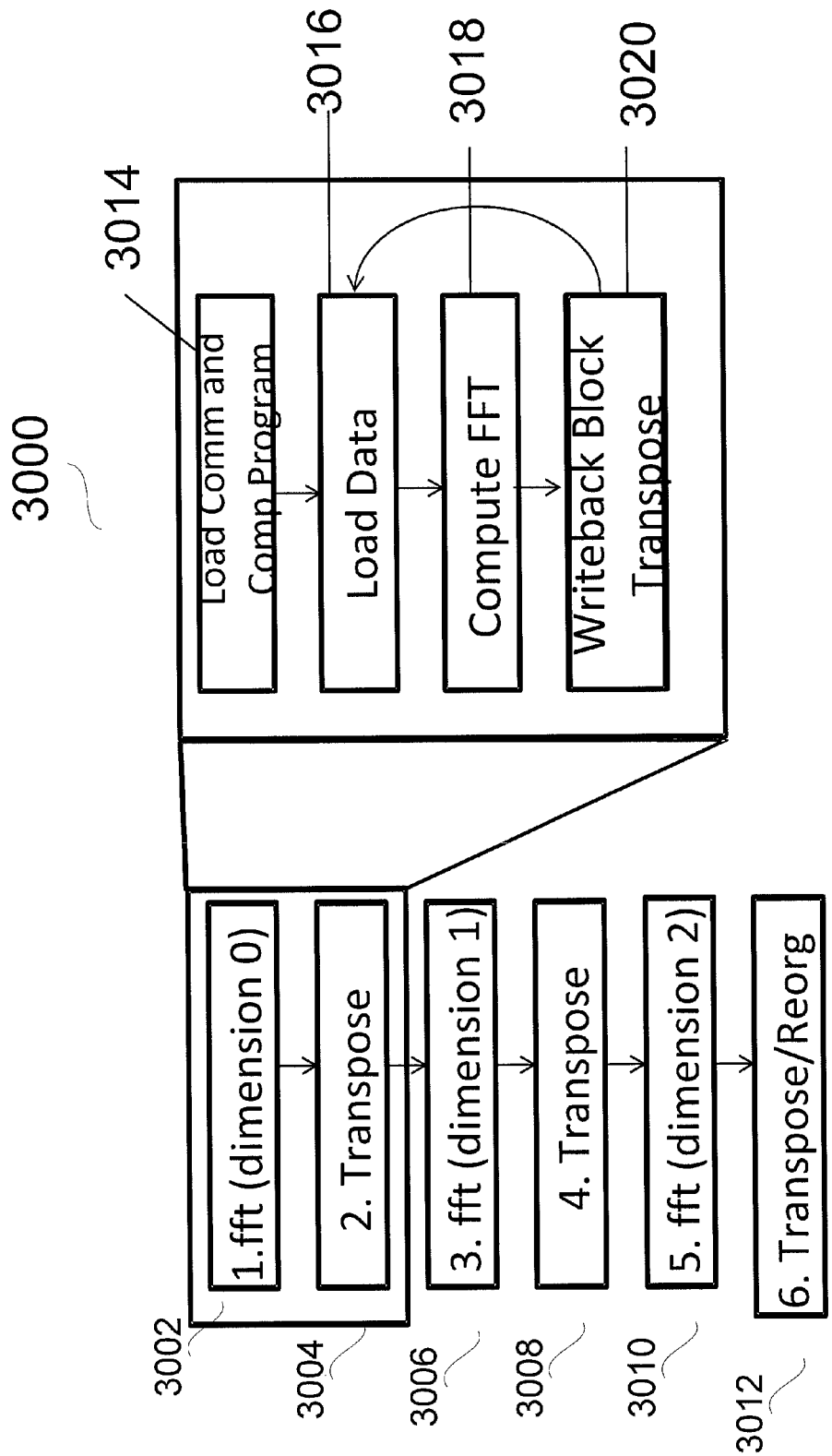
FIG. 30 illustrates a full n-cubic FFT process.

The overall process 3000 for a 3-dimensional Cooley-Tukey FFT with arbitrarily-sized input array and local memory is shown in FIG. 30. In that figure, there are six high-level steps (3002, 3004, 3006, 3008, 3010, and 3012). Each of those is paired to include an FFT computation step, in which the FFT of each dimensional row is computed in parallel and corrected, and a transpose step, in which the data is block-transposed using in-flight data reorganization into the external memory.

FIG. 30 shows sub-steps involved in each pair of dimensional computation steps. Each step starts with the load (3014) into each processor of the Communication (Comm) program and the Computation (Comp) program. This is done by performing a burst read from the external memory, and, based upon a basic "Bootstrap" program, the processors taking their correct programs off of the waveguide at the appropriate time in an inverse re-organization operation. The Comm programs can be written in such a way that they take into account the delay for all processors to receive their programs. They can then individually delay the start of the FFT data load process (3016) until all processors are ready. It is possible to do this implicitly because of the determinism allowed by the globally synchronous waveguide. Once the programs are loaded, a loop begins in which FFT rows are streamed out and caught by the appropriate processors (3016). The load data may be a reorganized access, either normal or inverse. Then the FFT, including correction is computed (3018), and a transpose is performed in-flight back to the external memory (3020). This is repeated until all dimensional rows of the FFT are computed and then transposed.

Figure 31:
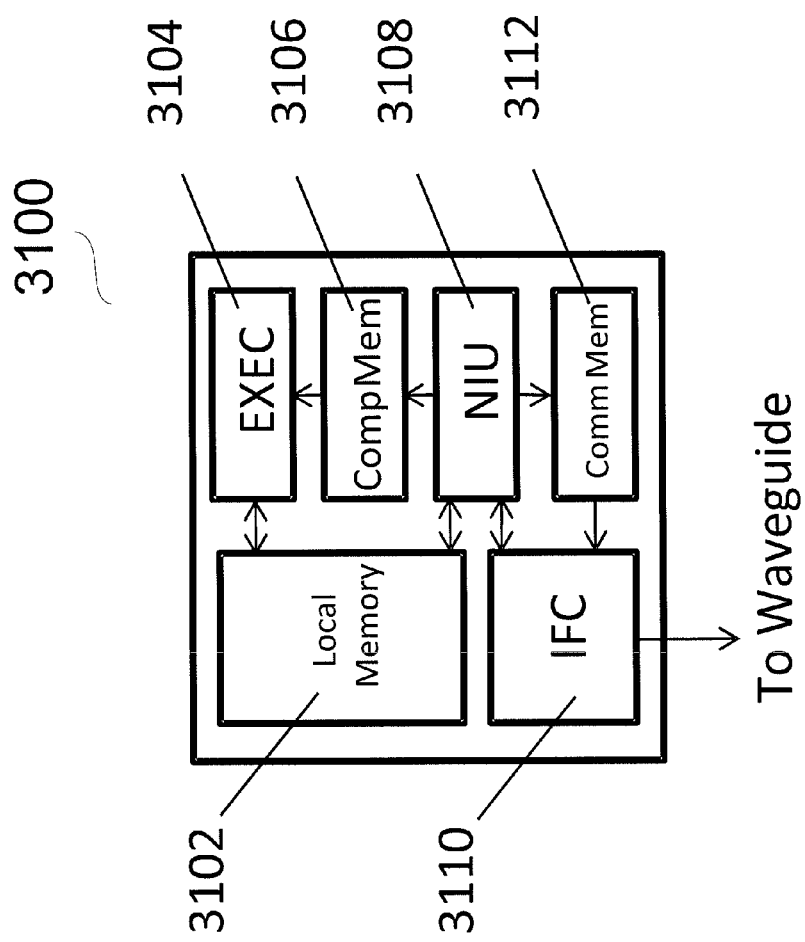
FIG. 31 illustrates a processing element.

A processing element 3100 of a machine that could realize this data pattern is shown in FIG. 31. The computation core in that processor consists of a local memory (3102), an execution unit (3104), and a computation code memory (3106). The execution unit contains all of the arithmetic units needed to compute the FFT. The computation code and local memories are fed via the Network Interface Unit (NIU) (3108). The NIU coordinates distribution of data from the Waveguide Interface (IFC) (3110) to the various memories in the processing element. The IFC coordinates in-flight data reorganizations based upon a program stored in the Communication memory (3112). Many of these processing elements could be chained together to form a full system.

Another potential application domain lies in the area of distributed processing of very large data sets. A common programming model for distributed data center computing, MapReduce, creates and processes massive data sets across a cluster of processing nodes. MapReduce applications, such as the construction of an inverted index used by internet search engines, impose a challenging all-to-all data redistribution pattern on commodity networking hardware. The redistribution is very costly in terms of time, and the hardware added to support it significantly impacts the electrical power and physical area of the computer system or data center.

As discussed above, computation of a broad range of applications may thus be impacted, including application kernels and fundamental operations in a wide variety of fields. Those listed here represent a vertical cross-section of the applicability of this technique. Many others will be impacted because of the alleviation of data locality constraints on application hardware.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

While this invention has been particularly shown and described with references to example embodiments thereof, it will be understood by those skilled in the art that various changes in form and details may be made therein without departing from the scope of the invention encompassed by the appended claims.

What is claimed is:

1. A method of reorganizing data across multiple electronic components comprising:
    at one or more of the electronic components, modulating at least one light beam on a shared photonic interconnect with data according to a defined global schedule; and
    at one or more of the electronic components, receiving data from the modulated light beam according to the defined global schedule, data being sent from at least one electronic component to plural electronic components or from plural electronic components to at least one electronic component to reorganize the data across the electronic components.

2. The method of claim 1 wherein the data is reorganized to perform a matrix transpose operation.

3. The method of claim 1 wherein at least one of the electronic components is a memory controller and wherein the data from plural electronic components is used to modulate the at least one light beam, and further wherein the data is received by the memory controller as a single transaction and is written to memory.

4. The method of claim 3 wherein the memory controller then modulates at least one second light beam on the shared photonic interconnect with data read from memory and the data is received from the second light beam at plural electronic components.

5. The method of claim 1 wherein at least one of the electronic components is a memory controller and further wherein the memory controller reads the data from memory and the at least one light beam is then modulated on the shared photonic interconnect with the data read from memory according to the defined global schedule.

6. The method of claim 1 wherein plural electronic components are formed on a common integrated circuit chip.

7. The method of claim 1 wherein the data is wavelength division multiplexed onto the shared photonic interconnect.

8. The method of claim 1 wherein the data is time division multiplexed on the shared photonic interconnect.

9. The method of claim 1 wherein the data is spatially multiplexed on multiple waveguides of the shared photonic interconnect.

10. The method claim 1 wherein the data is multiplexed on the shared photonic interconnect based on at least two of wavelength, time and space.

11. The method of claim 1 wherein a global clock is transmitted to the electronic components over the shared photonic interconnect.

12. The method of claim 1 wherein the data is reorganized in processing a Fast Fourier Transform.

13. The method of claim 1 wherein the shared photonic interconnect comprises a waveguide.

14. A data processing system comprising:
a shared photonic interconnect; and
multiple electronic components, each electronic component configured to modulate a light beam on the shared photonic interconnect and to receive the data from the modulated light beam according to a global schedule to reorganize data across the multiple electronic components.

15. The data processing system of claim 14 wherein the data is reorganized to perform a matrix transpose operation.

16. The data processing system of claim 14 wherein at least one of the electronic components is a memory controller and wherein the data from the electronic components is used to modulate the light beam, and further wherein the data is received by the memory controller as a single transaction and is written to memory.

17. The data processing system of claim 16 further wherein the memory controller modulates a second light beam on the shared photonic interconnect with data read from memory and the data is received from the second light beam at plural electronic components.

18. The data processing system of claim 14 wherein at least one of the electronic components is a memory controller and further wherein the memory controller reads the data from memory and the light beam is then modulated on the shared photonic interconnect with the data read from memory according to the global schedule.

19. The data processing system of claim 14 wherein multiple electronic components are formed on a common integrated circuit chip.

20. The data processing system of claim 14 wherein the data is wavelength division multiplexed onto the shared photonic interconnect.

21. The data processing system of claim 14 wherein the data is time division multiplexed on the shared photonic interconnect.

22. The data processing system of claim 14 wherein the data is spatially multiplexed on multiple waveguides of the shared photonic interconnect.

23. The data processing system of claim 14 wherein the data is multiplexed on the shared photonic interconnect based on at least two of wavelength, time and space.

24. The data processing system of claim 14 wherein the shared photonic interconnect carries a global clock transmitted to the electronic components.

25. The data processing system of claim 14 wherein the data is reorganized in processing a Fast Fourier Transform.

26. The data processing system of claim 14 wherein the shared photonic interconnect comprises a waveguide.

27. A computer program product for controlling communication patterns within a data processing system, the data processing system comprising a shared photonic interconnect and multiple electronic components, the computer program product comprising:
a non-transitory computer readable storage medium having computer readable communication program code embodied therewith, the computer readable communication program code being configured to set a schedule, the schedule being loaded into one or more of the electronic components, the one or more electronic components modulating at least one transmit light beam on the shared photonic interconnect with transmit data according to the schedule, the one or more electronic components receiving data from a modulated receive light beam on the shared photonic interconnect according to the schedule to reorganize data across the multiple electronic components.

28. The computer program product of claim 27 wherein the computer readable program code is executed synchronous to a global clock being carried by the shared photonic waveguide.

29. The computer program product of claim 27 wherein the computer readable program code is derived from a software tool or chain of tools based on a high-level instruction specifying a Fast Fourier Transform.

30. The computer program product of claim 27 wherein the computer readable storage medium includes having computer readable computation control program code embodied therewith, the computation control program code being derived from different phases of an algebraic computation.

31. The computer program product of claim 30 wherein the algebraic computation is a Fast Fourier Transform.

32. The computer program product of claim 30 wherein the computer readable computation control program code is executed synchronous to a global clock being carried by the shared photonic waveguide.

33. The computer program product of claim 30 wherein the computer readable computation control program code is derived from a software tool or chain of tools based on a high-level instruction specifying the algebraic computation.

34. An electronic component in a data processing system the electronic component configured to reorganize data, the electronic component comprising a computation core, the computation core comprising:

- an execution unit coupled to at least one memory, the execution unit configured to execute computation instructions stored in the at least one memory;
- a network interface unit coupled to the at least one memory and a communication memory, the network interface unit configured to distribute data to the at least one memory and the communication memory; and
- a waveguide interface unit, the waveguide interface unit being coupled to the network interface unit, the communication memory, and a shared photonic interconnect, the waveguide interface unit configured to coordinate reorganization of data based on communication instructions stored in the communication memory.

35. The electronic component of claim 34 wherein the reorganization of data coordinated is used to perform a matrix transpose operation.

36. The electronic component of claim 34 wherein the reorganization of data coordinated is based on processing of a Fast Fourier Transform.

37. The electronic component of claim 34 wherein the at least one memory comprises local memory and computation memory.

38. The electronic component of claim 34 wherein the communication instructions comprises a schedule, and further wherein the electronic component receives data from a modulated light beam according to the schedule.

* * * * *